United States Patent
Hori et al.

(10) Patent No.: US 6,810,061 B2
(45) Date of Patent: Oct. 26, 2004

(54) DISCHARGE ELECTRODE AND DISCHARGE ELECTRODE MANUFACTURING METHOD

(75) Inventors: Tsukasa Hori, Kanagawa (JP); Akira Sumitani, Isehara (JP); Takayuki Yabu, Hiratsuka (JP); Teiichirou Chiba, Hiratsuka (JP); Hakaru Mizoguchi, Hiratsuka (JP); Osamu Wakabayashi, Hiratsuka (JP); Junichi Fujimoto, Fujisawa (JP)

(73) Assignees: Komatsu Ltd., Tokyo (JP); Gigaphoton Inc., Tokyo (JP)

( * ) Notice: Subject to any disclaimer, the term of this patent is extended or adjusted under 35 U.S.C. 154(b) by 0 days.

(21) Appl. No.: 10/225,286

(22) Filed: Aug. 22, 2002

(65) Prior Publication Data

US 2003/0042436 A1 Mar. 6, 2003

(30) Foreign Application Priority Data

Aug. 27, 2001 (JP) .................................... 2001-256201

(51) Int. Cl.$^7$ .............................................. H01S 3/097
(52) U.S. Cl. ...................................................... 372/87
(58) Field of Search ............................... 372/55, 57–59, 372/61, 87

(56) References Cited

U.S. PATENT DOCUMENTS

| | | | |
|---|---|---|---|
| 4,956,848 A | * 9/1990 | Terai et al. | 372/87 |
| 5,172,389 A | * 12/1992 | Horiuchi et al. | 372/87 |
| 5,373,528 A | * 12/1994 | Kuzumoto et al. | 372/87 |
| 6,215,806 B1 | * 4/2001 | Ohmi et al. | 372/57 |
| 6,363,094 B1 | 3/2002 | Morton et al. | |
| 6,414,979 B2 | 7/2002 | Ujazdowski et al. | |
| 2001/0050937 A1 | * 12/2001 | Hori et al. | 372/55 |
| 2002/0050937 A1 | 5/2002 | Boehm et al. | |
| 2002/0051478 A1 | 5/2002 | Morton | |
| 2002/0080840 A1 | 6/2002 | Morton | |
| 2002/0122453 A1 | 9/2002 | Morton | |

FOREIGN PATENT DOCUMENTS

| | | | |
|---|---|---|---|
| JP | 03194982 A | 8/1991 | |
| JP | 03231480 A | * 10/1991 | .......... H01S/3/038 |
| JP | 04000775 A | 1/1992 | |
| JP | 2002-057386 A | 2/2002 | |
| JP | 2002-094151 A | 3/2002 | |

* cited by examiner

Primary Examiner—Don Wong
Assistant Examiner—James Menefee
(74) Attorney, Agent, or Firm—Varndell & Varndell, PLLC

(57) ABSTRACT

A film is formed on the discharge parts of the main discharge electrodes. In order to prevent erosion of the discharge parts by the halogen gas contained in the laser gas, a substance that tends not to react with the halogen gas, i.e., a halogen-resistant substance, is used for this film. Furthermore, in order to prevent deformation of the discharge parts by the bombardment and heat of the main discharge, a substance that has a higher hardness than the metal of the main discharge electrodes or a substance that has a higher melting point than the metal of the main discharge electrodes is used for this film. As a result, deterioration of the electrodes can be inhibited, so that a stable laser output can be obtained, and the replacement interval of the electrodes can be extended.

20 Claims, 26 Drawing Sheets

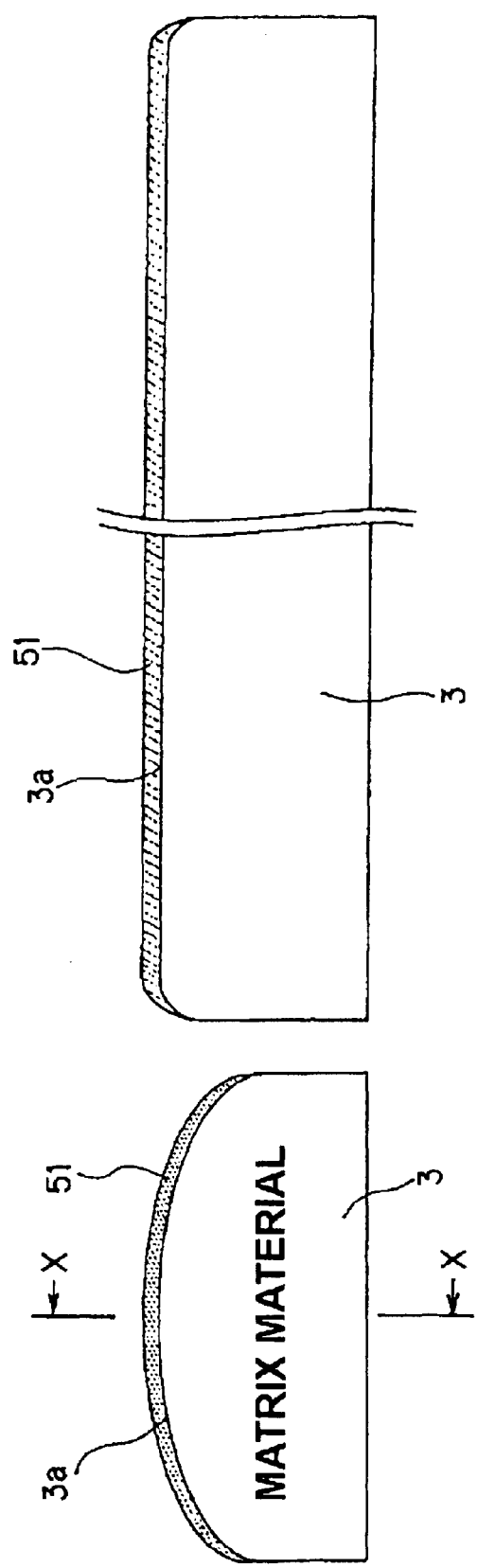

BLACK: INSULATOR
WHITE: CONDUCTOR

BLACK: INSULATOR
WHITE: CONDUCTOR

BLACK: INSULATOR
WHITE: CONDUCTOR

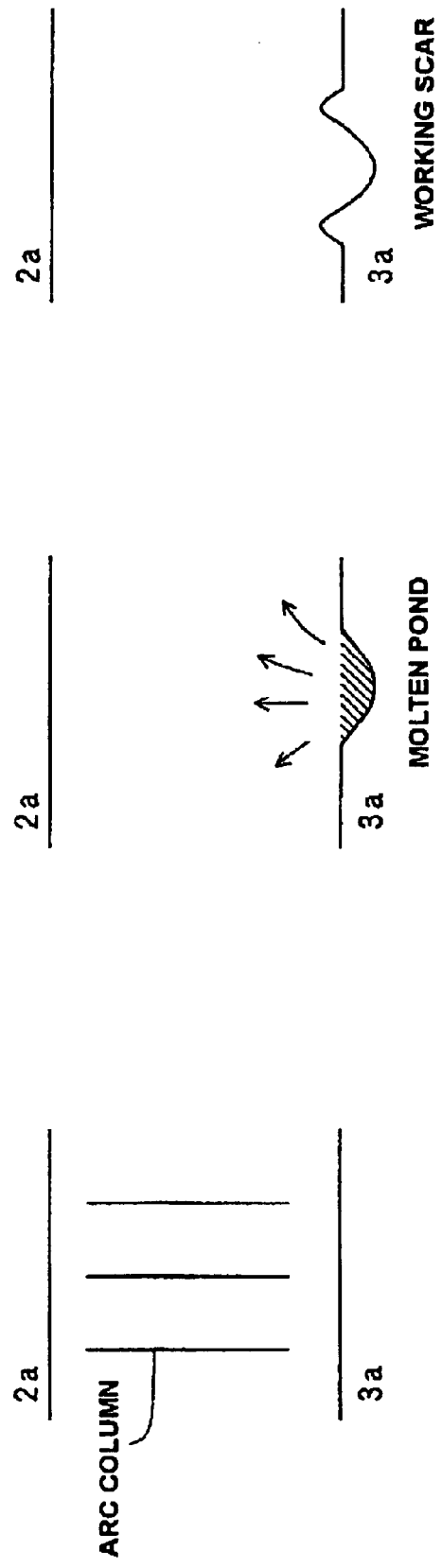

TYPE 1

TYPE 2

TYPE 3

TYPE 4

TYPE 5

TYPE 6

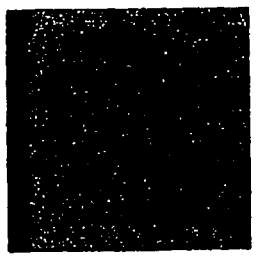
FIG.16A
TYPE 1
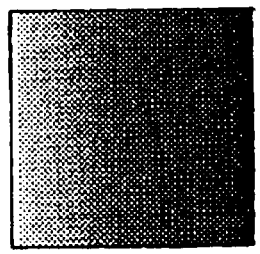
FIG.16B
TYPE 2
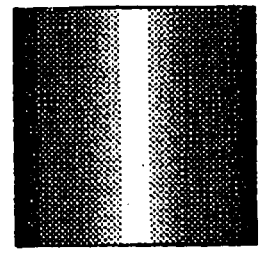
FIG.16C
TYPE 3
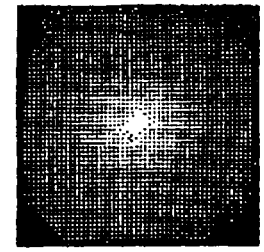
FIG.16D
TYPE 4
CONDUCTOR: LARGE QTY
INSULATOR: SMALL QTY
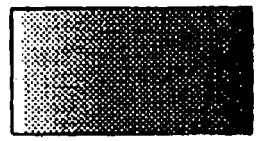
CONDUCTOR: SMALL QTY
INSULATOR: LARGE QTY

FIG.17A TYPE 1 
FIG.17B TYPE 2 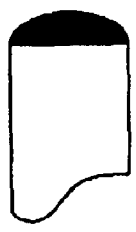
FIG.17C TYPE 3 
FIG.17D TYPE 4 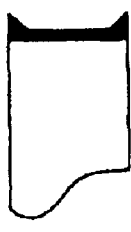
  TYPE 5
  TYPE 6
  TYPE 7
  TYPE 8

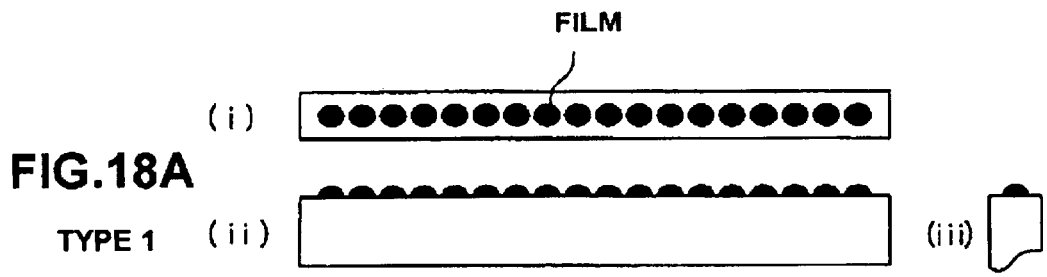
FIG. 18A TYPE 1
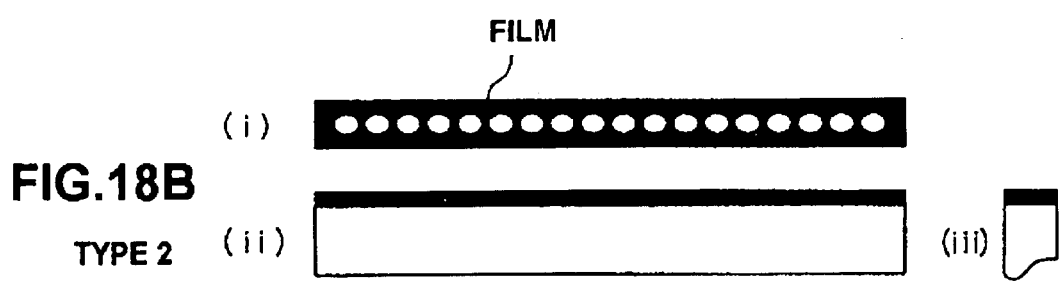
FIG. 18B TYPE 2
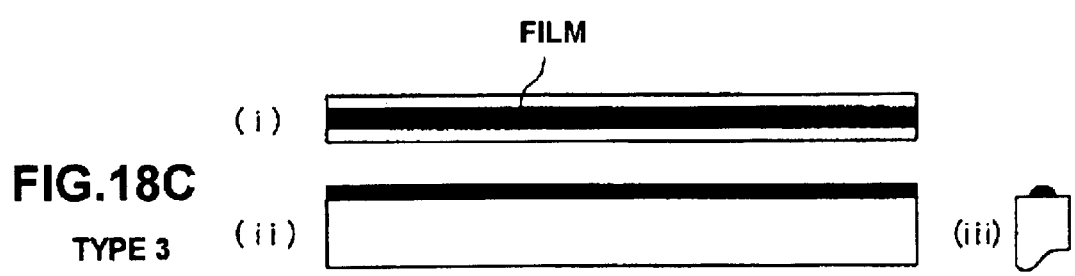
FIG. 18C TYPE 3
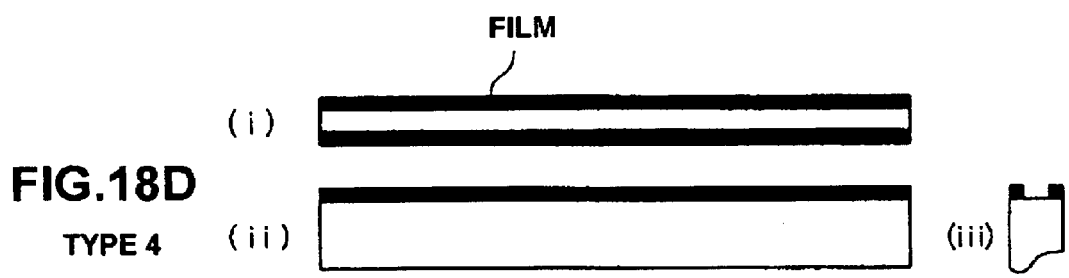
FIG. 18D TYPE 4
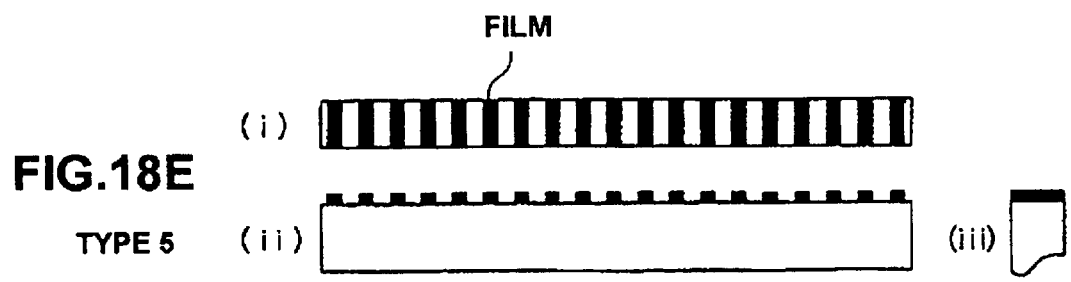
FIG. 18E TYPE 5

PULSED POWER CURRENT

PULSED POWER CURRENT

DISCHARGE ELECTRODE AND DISCHARGE ELECTRODE MANUFACTURING METHOD

BACKGROUND OF THE INVENTION

1. Field of the Invention

The present invention relates to a discharge electrode used in a laser apparatus in which a laser gas containing a halogen gas is excited by a discharge performed between electrodes, and a discharge electrode manufacturing method.

2. Description of the Related Art

FIGS. 27A and 27B are sectional views of an excimer laser apparatus or fluorine molecular laser apparatus.

In a gas laser apparatus such as an excimer laser apparatus or fluorine molecular laser apparatus, a laser gas is sealed inside a laser chamber 10. A mixed gas comprised of a rare gas (krypton Kr in the case of a KrF excimer laser, argon Ar in the case of an ArF excimer laser, and the like), a halogen gas (fluorine $F_2$ or the like) and a buffer gas (neon Ne) is used as the laser gas. In order to cause laser oscillation by exciting this laser gas, main discharge electrodes (cathode and anode) 2 and 3 which are disposed facing each other across the optical axis L of the laser light, and preparatory dissociation electrodes 41 and 42 which cause preparatory dissociation of the laser gas between the main discharge electrodes 3 and 3 in order to facilitate the generation of a discharge between the main discharge electrodes 2 and 3, are disposed inside the laser chamber 10.

In the case of such a gas laser apparatus, as a result of the preparatory dissociation of the laser gas between the main discharge electrodes 2 and 3 by the preparatory dissociation electrodes 41 and 42, a discharge is generated between these main discharge electrodes 2 and 3, and the laser gas is thus excited so that a laser oscillation is generated. Furthermore, as is universally known, the generation of a stable discharged between the main discharge electrodes 2 and 3 results in a stable laser oscillation, so that a stable laser output is obtained.

The main discharge electrodes used in such a gas laser apparatus include the electrodes described in Japanese Utility Model Application Laid-Open No. 61-174764 (hereafter referred to as "Reference 1"), Japanese Patent Application Laid-Open No. 62-199078 (hereafter referred to as "Reference 2"), and Japanese Patent Application Laid-Open No. 63-227069 (hereafter referred to as "Reference 3").

In the electrodes described in the abovementioned Reference 1, the side surface portions of the main discharge electrodes other than the portions of the surfaces of the electrodes where a discharge is performed (hereafter referred to as the "discharge portions") are closely covered with an insulating material in order to prevent a discharge from occurring between the main discharge electrodes and the arc discharge electrodes (corresponding to the preparatory dissociation electrodes) even in cases where the gap between the main discharge electrodes and the arc discharge electrodes is short.

Furthermore, in the electrodes described in the abovementioned Reference 2, at least portions of the laser tube or discharge members are coated with a halogen corrosion-resistant resin layer in order to suppress problems such as corrosion of the inside walls of the laser tube or discharge members, deterioration of the sealed gas and the like caused by the generation of strong ultraviolet radiation, ions, electrons and the like in large quantities in the vicinity of the main discharge electrodes.

Furthermore, in the electrodes described in the abovementioned Reference 3, insulators are mounted on the end portions, e.g., the local surface portions of the end portions, of the main discharge electrodes so that a stable glow discharge is obtained at the flat surface portions located in the centers of the main discharge electrodes, and so that insulation breakdown and arcing in the end portions of the main discharge electrodes are prevented.

Furthermore, main discharge electrodes other than the electrodes described in these references include main discharge electrodes in which the cathode surfaces in the main discharge electrodes constructed from an anode and cathode are coated with a dielectric thin film. In such electrodes, deterioration of the anode (deformation of the electrode) caused by discharge bombardment is alleviated by utilizing the drop in the discharge initiation voltage that occurs as a result of the cathode surfaces being coated with a dielectric thin film.

However, in cases where the main discharge electrodes of the abovementioned References 1 through 3 are actually installed inside the laser chamber of an excimer laser apparatus such as a krypton-fluorine (KrF) excimer laser, argon-fluorine (ArF) excimer laser or the like, or the laser chamber of a fluorine molecular ($F_2$) laser apparatus, a reaction occurs between the halogen gas (fluorine or the like) contained in the laser gas and the discharge part of the anode as a result of the repetition of the laser oscillation operation, so that the anode is halogenated (fluorinated in the case of fluorine). Furthermore, as a result of discharge bombardment and heat, the discharge part of the anode is deformed from a flat state into a shape with indentations and projections. Moreover, the discharge part of the cathode is also halogenated, although to a slight degree compared to the anode, and the discharge part of the cathode also deteriorates as a result of sputtering.

As a result, the discharge between the main discharge electrodes becomes unstable, so that the output energy of the laser drops, thus making it impossible to obtain the desired laser output characteristics.

In order to counter this problem, it is necessary to take measures such as raising the gas pressure inside the laser chamber, raising the voltage that is applied across the main discharge electrodes, or the like. In some cases, it may be necessary to replace the deteriorated main discharge electrodes. Furthermore, even in cases where the deteriorated electrodes are replaced with fresh electrodes, problems similar to those described above still occur; as a result, there is a frequent electrode replacement cycle. When the electrodes are replaced, the entire laser chamber must be re-assembled, so that the working characteristics are extremely poor; this results in the problem of increased maintenance costs.

Even in the case of main discharge electrodes in which the cathode surface is coated with a dielectric thin film, the discharge part of the anode where a discharge is performed between the anode and cathode is not coated with such a thin film. Accordingly, as was described above, stable laser output characteristics cannot be obtained because of degeneration of the electrodes (anode) caused by halogenation (e.g., fluorination) of the electrode material, and deterioration of the anode (deformation of the electrode) caused by discharge bombardment.

Thus, if the abovementioned conventional techniques are used, a metal fluoride film is formed on the surfaces of the main discharge electrodes in proportion to the number of laser shots, so that there is an effect on the stability of the main discharge. If the stability of the main discharge reaches a range that is not permitted from the standpoint of laser performance, the electrodes must be replaced.

In regard to this problem, W/O 01/97344, U.S. Patent Application Laid-Open No. 2001/50939 (hereafter referred to as "Reference 4") indicates the following:

The metal fluoride film (copper fluoride in the case of copper electrodes) that is formed on the electrode discharge parts increases in proportion to the number of laser shots, and when this film reaches approximately 50 to 80% of the electrode discharge part regions, this is viewed as being the useful life of the electrodes. In cases where the main discharge is performed in regions that are covered by a metal fluoride film, the current flows through small holes with a diameter of 50 to 100 $\mu$m. In regions where a metal fluoride film is formed, there is no further progression of erosion caused by fluorine. However, as the regions that are covered by a metal fluoride film in the discharge parts become smaller, the rate of erosion in the regions that are not covered by a metal fluoride film is accelerated. During the main discharge, the manner in which the current flows varies between areas in which a metal fluoride film is formed and area in which such a film is not formed. Accordingly, as the formation of a metal fluoride film progresses, the uniformity of the main discharge is lost. As a result, the beam quality suffers, and the useful life of the electrodes is reached.

As a countermeasure against this problem, according to the technique described in Reference 4, a groove that matches the electrode width is formed in the discharge part, and a metal called an "erosion pad" that differs from the electrode matrix material is embedded in this groove. Furthermore, an annealing treatment is performed prior to this embedding in order to achieve tightly packed crystal grain boundaries in the erosion pad. As a result, it is thought that chemical erosion of the electrodes by fluorine can be prevented. In other words, in Reference 4, it is considered that the metal fluoride film that is formed on the discharge parts of the electrodes is a harmful substances that destroys the stability of the discharge, so that it is necessary to prevent the formation of such a metal fluoride film on the discharge parts of the electrodes as far as this is possible.

In the technique described in FIG. 4, since a metal fluoride film that is formed non-uniformly in the longitudinal direction of the electrodes causes a drop in the laser performance, measures are taken in order to prevent the formation of a metal fluoride film.

Here, the principle of the fluorination of metals will be described.

Fluorine is a substance that has an extremely high reactivity, and will react with various substances. When a metal is exposed to a fluorine atmosphere, the surface of the metal is eroded by the fluorine so that a metal fluoride is formed. However, in the case of a metal fluoride, the phenomenon described below progresses, so that after a fixed period of time has elapsed, the erosion of the metal by the fluorine either stops or becomes saturated at a low erosion rate.

When a metal is exposed to fluorine gas, the fluorine invades the metal to a certain depth from the metal surface. The reason for this is that even though a metal appears to be dense, there are gaps between the atoms of the metal, so that fluorine enters the metal via these gaps. Accordingly, fluorine not only reacts with the metal at the surface, but also erodes the metal by reacting with the metal at a certain depth. The erosion depth of fluorine can be expressed by an exponential function (1) that depends on the metal temperature or fluorine gas temperature.

$$\delta = A \exp(-\alpha/t) \quad (1)$$

($\delta$: fluorine invasion depth, t: temperature of gas or metal, A and $\alpha$: constants determined by the types of gas and metal involved, the crystal structure, the size of atoms or molecules, and the like).

As the reaction proceeds to a certain extent, fluorination of the metal progresses, so that the film thickness of the metal fluoride exceeds the fluorine invasion depth. As a result, the fluorine entering from the surface of the metal fluoride film carbon nanocoil no longer contact the metal. Consequently, it is thought that the erosion of the metal by the fluorine either stops or becomes saturated at a low erosion rate.

One example of a technique using the effects of fluorine erosion on metals is a fluorination passivation treatment. This treatment is a treatment that modifies the surfaces of metal instruments that are used in a fluorine atmosphere, so that these surfaces are endowed with fluorine resistance. In a fluorination passivation treatment, the instrument that is being treated is exposed to fluorine gas that has been elevated to a high temperature, so that a thick metal fluoride film is formed on the surface of the instrument. In a fluorine gas atmosphere at a temperature that is lower than the temperature used during the fluorination passivation treatment, the fluorine does not have an invasion depth that exceeds the invasion depth at the time of the fluorination passivation treatment. Accordingly, the instrument is protected from fluorine erosion by the metal fluoride film that is formed by the fluorination passivation treatment.

Here, assuming that the metal is an electrode used for gas laser excitation, a case will be described in which a metal fluoride film is formed on the electrode during the operation of the laser.

This electrode used for gas laser excitation is exposed to fluorine contained in the laser gas for a long period of time inside the laser chamber. Accordingly, as in the case of the abovementioned fluorine erosion of metals in general, the electrode discharge part is eroded by the fluorine so that a metal fluoride is formed. Generally, as is mentioned in Reference 4, it appears that the following phenomena A through D occur as fluorination proceeds in the electrode discharge part, thus determining the useful life of the laser electrodes.

A. The electrical conductivity of the electrodes drops, so that the oscillation efficiency drops due to energy consumption other than that of the main discharge.

B. The distance between facing electrodes increases as a result of consumption of the electrodes, so that matching of the electrodes and power supply is lost, thus resulting in a drop in the energy transmission efficiency.

C. The shape of the discharges parts becomes rough as a result of consumption of the electrodes, so that the main discharge becomes non-uniform, and the laser excitation efficiency drops.

D. The electrodes are consumed in a non-uniform manner in the longitudinal direction, so that the main discharge becomes non-uniform, and the laser gain has a non-uniform distribution.

As a result of the abovementioned A through D, the laser performance gradually drops. At the point in time at which the drop in performance exceeds a permissible range, it is judged that the end of the useful life of the electrodes has been reached, so that maintenance work such as electrode replacement or the like is necessary.

When electrodes actually used in laser operations are analyzed, the characteristics shown in 1 through 8 below are seen:

1. A metal fluoride film is formed on the discharge parts of the electrodes in accordance with the number of laser shots.
2. In some cases, the metal fluoride film is formed uniformly in the longitudinal direction of the electrodes, while in other cases, the metal fluoride film is formed non-uniformly in the form of streaks or islands.
3. In portions where a thick metal fluoride film is formed, consumption of the electrode is inhibited.
4. The thickness of the metal fluoride film is formed at a rate of approximately 0.05 to 0.1 mm/$1 \times 10^9$ shots. However, as the number of shots increases, the formation rate becomes saturated so that this rate approaches zero.
5. The metal fluoride film that is formed is not dense; voids are present in the interior of the film. Furthermore, metal that has not been fluorinated is dispersed in the interior of the film.
6. The shape of the discharge parts of the electrodes reaches a state in which the original shape is not preserved as a result of damage caused by fluorine and the main discharge.
7. The metal fluoride film shows complete insulating properties against a weak DC voltage.
8. The metal fluoride film is an insulator; however, even if a metal fluoride film that has the abovementioned properties is present on the discharge parts of the electrodes to a thickness of approximately 2 mm, a discharge that excites the laser is possible.

Thus, a metal fluoride film that differs from the metal fluoride film that is formed on the surface of a metal by the abovementioned fluorination passivation treatment is formed on an electrode that is eroded by fluorine as a result of use in a gas laser. The apparent reason for this is that an electrode that is used in the excitation of a gas laser is placed in an environment such as that described in (1) and (2) below, and this environment differs conspicuously from the environment in which a fluorination passivation treatment is performed.

(1) Different Heat Application Phenomena

In electrodes used in gas lasers, the temperature of the discharge part is an extremely high temperature of 100° C. or greater. Accordingly, the discharge part is in a state that is especially susceptible to the invasion of chlorine into the interior portions of the electrode. Furthermore, gas lasers are generally operated using a pulsed power discharge system in which an electric field is intermittently applied, so that a cycle in which heat is applied over a very short time of several hundred nanoseconds, and this heat is diffused over a time period ranging from several hundred microseconds to several milliseconds, is repeated.

(2) Non-Uniformity in the Longitudinal Direction of the Electrode

Since a long laser excitation region is required in gas lasers, long discharge electrodes with a rail gap configuration are usually used. In cases where the main discharge is performed using such electrodes, even though it may appear to the eye that a glow discharge that is uniform in the longitudinal direction is generated, non-uniformity occurs in the discharge density, i.e., the current density. When non-uniformity occurs in the current density, non-uniformity is generated in the temperature of the discharge parts. Non-uniformity in the temperature of the discharge parts has a great effect on the properties of the metal fluoride film that is formed on the discharge parts. In areas where the temperature is high, a thick metal fluoride film is formed, and the electrode matrix material is greatly eroded. Conversely, in areas where the temperature is low, a thin metal fluoride film is formed, and the electrode matrix material is not greatly eroded.

In areas where the temperature of the discharge parts in the electrodes is high so that these parts are subjected to fluorine erosion, a thick metal fluoride film or fluorinated layer is formed. The metal fluoride film is an insulator, and has a high electrical resistance. Accordingly, in cases where a current flows through the metal fluoride film, the metal fluoride film generates heat. Thus, in the discharge parts where a metal fluoride film is formed, the temperature rises so that fluorination proceeds to an increasing extent. Furthermore, this metal fluoride film generally has a low density. As a result, the fluorinate portions swell in the discharge part, so that these portions protrude compared to the portions that are not fluorinated. These protruding portions function as "lightning rods", so that the current arising from the main discharge is concentrated. Accordingly, the temperature of the fluorinated discharge parts rises even further locally.

When the temperature of the discharge parts shows such local rises, the invasion of the electrode matrix material by the fluorine is facilitated. As a result, fluorination proceeds not only from the discharge parts of the electrodes, but also from the interior portions of the electrodes. When fluorination proceeds from the interior portions of the electrodes, the electrode matrix material and the metal fluoride film formed on the discharge parts are joined in a graded manner resembling a gradient metal alloy (an alloy in which the proportion of the insulator is greater than that of the conductor at portions closer to the surface, while the proportion of the conductor is greater than that of the insulator at portions further inside thereof), so that an extremely strong structure is created. In such a state, the metal fluoride film that is formed remains on the discharge parts without peeling from the discharge parts. Furthermore, in portions where a thick metal fluoride film or metal fluoride layer is formed, it becomes difficult for fluorine or fluorine radicals to invade from the surface, so that the rate of erosion of the electrode matrix material by the fluorine becomes more gradual. As a result, the electrode consumption rate drops.

Conversely, in areas where the temperature of the discharge parts in the electrodes is low, so that the fluorine erosion is not that great, a thin metal fluoride film is formed on the surface layer. In areas where the temperature is thus low, the fluorine cannot invade deeply into interior of the electrode. As a result, fluorination of the electrode occurs in the vicinity of the surface. The bonding force of the metal fluoride film that is thus formed with the bulk material of the electrode is weak, so that the film is brittle. Accordingly, the film is easily stripped by sound waves generated by the main discharge, vibrations from the motor, the flow of gas, bombardment by the main discharge current, and bombardment by electrons, ions, neutral particles and excited particles, etc. Such a reaction is endlessly repeated; as a result, the electrode matrix material is greatly eroded.

Thus, the metal fluoride film that is formed on the electrodes during the operation of a laser differs from the metal fluoride film that is formed by a fluorination passivation treatment in that (1) the film is formed in a non-uniform manner, and (2) there are portions that are susceptible to fluorine erosion and portions that are resistant to fluorine erosion.

The abovementioned phenomenon A and the abovementioned characteristic 8 conflict with each other. This can be explained by the abovementioned characteristic 5.

Generally, in the case of a pulsed power discharge, the voltage is applied for a short period of time; accordingly, the discharge has high-frequency characteristics. As a result of the surface skin effect, a high-frequency current has the property of flowing through the surface layer (several hundred $\mu$m) of a substance. In other words, a high-frequency current is not greatly affected by the electrical conductivity of the substance. Accordingly, this high-frequency current differs from a direct current in that this current can flow even at the surface of an insulator. As in the case of a high-frequency current, the relative ease with which a pulsed power discharge current flows depends not on the electrical conductivity of the substance itself, but rather on the size of the surface area of surfaces such as the interfacial surfaces between substances.

This will be examined in terms of a metal fluoride film. Voids and metal portions that have not bee fluorinated are present in a dispersed state in the metal fluoride film formed on the discharge parts of the electrodes by a laser operation. Current pathways from the surface of the metal fluoride film to the electrode matrix material are maintained by the surfaces of voids and the interfacial surfaces between fluorinated metal areas and non-fluorinated metal areas. Thus, electrical conductivity with respect to the pulsed power discharge current is ensured. Accordingly, the metal fluoride film formed by an actual laser operation does not show high insulating properties with respect to the pulsed power discharge. Consequently, the drop in the laser performance caused by the presence of a metal fluoride film is not that great.

Thus, it is confirmed that the metal fluoride film that was generally thought to cause a drop in the laser performance is effective in decreasing electrode consumption without causing a great drop in the laser performance. In cases where the laser is operated in a state in which the gas pressure, fluorine concentration, input energy, applied voltage, electrode temperature and the like are optimized in order to maintain the laser performance, such a metal fluoride film is formed on the electrode discharge parts.

However, since the laser operation is not performed for the purpose of forming a metal fluoride film on the electrode discharge parts, the properties of the metal fluoride film that is formed cannot be regulated. As a result, the metal fluoride film tends not to be formed uniformly on the electrode discharge parts. A non-uniform metal fluoride film results in non-uniform consumption of the electrodes, so that the laser output becomes unstable. Furthermore, it becomes difficult to predict the useful life of the electrodes. Moreover, the shape of the electrode discharge parts is broken down, so that the laser oscillation efficiency drops.

Accordingly, it is an object of the present invention to provide a discharge electrode and discharge electrode manufacturing method which make it possible to inhibit deterioration of the electrodes so that a stable laser output is obtained, and which make it possible to prolong the intervals at which the electrodes must be replaced.

SUMMARY OF THE INVENTION

Accordingly, the first invention is a discharge electrode which contains a metal material, and which is used in a laser apparatus in which a laser gas containing a halogen gas is excited by a discharge performed between electrodes, wherein a film containing one or more substances that have a higher hardness than the metal and that are less reactive with a halogen gas than the metal is formed on surfaces of portions where the discharge is performed.

Furthermore, the second invention is a discharge electrode which contains a metal material, and which is used in a laser apparatus in which a laser gas containing a halogen gas is excited by a discharge performed between electrodes, wherein a film containing one or more substances that have a higher melting point than the metal and that are less reactive with a halogen gas than the metal is formed on surfaces of portions where the discharge is performed.

As is shown in FIGS. 1A and 1B, a film 5 is formed on the discharge parts 2a and 3a of the main discharge electrodes 2 and 3. In order to prevent the erosion of the discharge parts 2a and 3a by the halogen gas, one or more substances that tend not to react with the halogen gas contained in the laser gas, i.e., one or more halogen-resistant substances, are contained in the film 5. Furthermore, in order to prevent deformation of the discharge parts 2a and 3a by the bombardment or heat of the main discharge, one or more substances that have a higher hardness than the metal of the main discharge electrodes 2 and 3 or one or more substances that have a higher melting point than the metal of the main discharge electrodes 2 and 3 are contained in the film 5.

In the first and second inventions, a main discharge is performed between the main discharge electrodes 2 and 3 in which the abovementioned film 5 is formed on the discharge parts 2a and 3a. In this case, the erosion, bombardment and heat arising from the halogen gas accompanying the main discharge are absorbed by the film 5; accordingly, the discharge parts 2a and 3a are unaffected. Consequently, deterioration of the main discharge electrodes 2 and 3 is inhibited, so that a stable laser output can be obtained. Furthermore, since the useful life of the main discharge electrodes 2 and 3 is prolonged, the intervals at which the main discharge electrodes 2 and 3 must be replaced can be extended. Accordingly, maintenance costs can be reduced.

The third invention is according to the first invention, wherein the abovementioned film comprises an insulator.

The fourth invention is according to the second invention, wherein the abovementioned film comprises an insulator.

As shown in FIG. 2, an insulator 51 is used in the film 5 that is formed on the discharge parts 2a and 3a of the main discharge electrodes 2 and 3.

In the third and fourth inventions, the main discharge is performed through the insulator 51; as a result, the impact itself of the main discharge can be reduced and the consumption of the insulator 51 itself can be inhibited. Accordingly, the main discharge electrodes 2 and 3 have a long useful life.

The fifth invention is according to the first invention, wherein the abovementioned film comprises a mixture of an insulator and a conductor.

The sixth invention is according to the second invention, wherein the abovementioned film comprises a mixture of an insulator and a conductor.

As is shown in FIGS. 3A through 3C, a mixture 52 is used in the film 5 that is formed on the discharge parts 2a and 3a of the main discharge electrodes 2 and 3. The mixture ratio of the insulator and conductor is uniform in this mixture 52.

In the fifth and sixth inventions, a conductor is mixed with the mixture 52; as a result, the resistance between the main discharge electrodes 2 and 3 is lowered. Accordingly, the laser output is increased.

The seventh invention is according to the first invention, wherein the abovementioned film is a laminated film in which layers of the abovementioned conductor and layers of the abovementioned insulator are alternately laminated.

The eighth invention is according to the second invention, wherein the abovementioned film is a laminated film in which layers of the abovementioned conductor and layers of the abovementioned insulator are alternately laminated.

As is shown in FIGS. 4A and 4B, a mixture 53 is used in the film 5 that is formed on the discharge parts 2a and 3a of the main discharge electrodes 2 and 3. Layers of an insulator and layers of a conductor are alternately laminated in the mixture 53.

In the seventh and eighth inventions, when a main discharge is repeated between the main discharge electrodes 2 and 3, the mixture 53 itself is consumed. This consumption of the mixture 53 occurs as a result of the layers exposed at the surface of the mixture 53 being stripped from the layers underneath. Accordingly, as a result of the consumption of the mixture 53, the layers of a conductor and the layers of an insulator are alternately exposed at the surface of the mixture 53. When a conductor layer is exposed at the surface of the mixture 53, the laser output that is obtained differs from that obtained when an insulator layer is exposed at the surface of the mixture 53. Accordingly, if the number of laminated layers is known beforehand, the useful life of the mixture 53 itself can be ascertained by detecting variations in the laser output.

The ninth invention is according to the third invention, wherein the abovementioned insulator is a ceramic.

The tenth invention is according to the fourth invention, wherein the abovementioned insulator is a ceramic.

The eleventh invention is according to the fifth invention, wherein the abovementioned insulator is a ceramic.

The twelfth invention is according to the sixth invention, wherein the abovementioned insulator is a ceramic.

The thirteenth invention is according to the seventh invention, wherein the abovementioned insulator is a ceramic.

The fourteenth invention is according to the eighth invention, wherein the abovementioned insulator is a ceramic.

The ninth through fourteenth inventions indicate the concrete substances of the third through eighth inventions.

Here, (1) the most ideal electrodes, and (2) the next most ideal electrodes, will be described on the basis of facts ascertained by verification testing.

(1) Most Ideal Electrodes

As was described above, the laser performance drops as a result of damage to the electrodes. Accordingly, in order to maintain the laser performance, it is most ideal to devise the system so that the electrodes are not damaged. The greatest cause of damage to the electrodes is the main discharge that is performed in a fluorine atmosphere, i.e., a fluorine discharge. Accordingly, it is universally known that the use of a substance that has a high resistance to a fluorine discharge as the electrode matrix material is effective in suppressing electrode damage.

However, from the standpoint of the electrical characteristics of the electrodes, materials that have a high resistance to a fluorine discharge are not suitable as electrode matrix materials. Generally, materials that have a high fluorine discharge resistance are insulators, so that the electrical conductivity required in an electrode cannot be realized.

However, in the case of electrodes whose structure has been optimized as described above, electrical conductivity with respect to the pulsed power discharge current is ensured, and the electrodes also possess fluorine discharge resistance. In the case of such electrodes, most of the electrode is formed from a substance (conductor (metal)) that is suitable for an electrode, with only the electrode discharge parts that are exposed to the fluorine discharge being covered by a substance (insulator) that possesses fluorine discharge resistance.

As a result of the realization of such a structure, the electrode discharge parts are not eroded by fluorine, and the performance of the electrode discharge parts as electrodes is ensured; accordingly, the main discharge that is required for laser excitation can be formed. Since the electrodes are not eroded by fluorine, fluctuation in the laser performance is eliminated from the outset, so that maintenance is unnecessary until the design useful life of the electrodes is ended.

(2) Next Most Ideal Electrodes

In the case of electrodes in which a substance that has fluorine discharge resistance is formed on the electrode discharge parts as in (1) above, damage is inhibited. However, in cases where a substance that has fluorine discharge resistance is formed on the electrode discharge parts, the following problems are encountered:

Even in the case of a substance with extremely superior fluorine discharge resistance, there may be instances of local damage caused by the fluorine discharge. When such local damage occurs, the discharge is concentrated in the damaged areas, so that the uniformity of the discharge is lost. Furthermore, this leads to non-uniformity of the electrode erosion. Accordingly, the next most ideal approach is to ensure a path for the passage of the pulsed power discharge beforehand.

In the case of such electrodes, most of the electrode is formed from a substance (conductor (metal)) that is suitable for an electrode, with the electrode discharge parts that are exposed to the fluorine discharge being covered by a film of a mixed material in which a substance (insulator) that possesses fluorine discharge resistance and a substance (conductor (metal)) that is suitable for an electrode are uniformly dispersed. As was described above, a pulsed power discharge has the property of flowing through the surface layer of a substance. Accordingly, the pulsed power current reaches the electrodes via the interfacial surfaces between the insulator and conductor (metal).

In the case of such a structure, the metal in the mixed material and the electrode matrix material itself are fluorinated. The conditions of formation of this fluoride are as follows:

First, the metal portions constituting the conductor in the film of mixed material that covers the electrode discharge parts are fluorinated so that a metal fluoride is formed. An insulator that possesses fluorine discharge resistance is present around this metal fluoride. As a result of the presence of this insulator, the metal fluoride remains without being stripped from the electrode discharge parts. Furthermore, even though the insulator that possesses fluorine discharge resistance may be slightly stripped from the electrode discharge parts, the metal fluoride and metal both form a film of a mixed material. Generally, since metal fluorides have a good fluorine resistance, this mixed-material film possesses good fluorine discharge resistance. Furthermore, since a film with such a composition has interfacial surfaces between different substances, sufficient electrical conductivity is shown with respect to the pulsed power current as a result of the surface skin effect. As a result of these properties, even if there is some fluctuation in the composition of the substance constituting the electrode discharge parts, the shape of the outermost surfaces of the electrodes and the electrical conductivity of the electrodes show no great fluctuation compared to the fluctuation that occurs prior to the discharge.

As the laser operation continues so that the invasion of fluorine moves beyond the mixed-material film and reaches the electrode matrix material (metal), the fluorine begins to invade the electrode matrix material. However, the composition of the fluoride that is formed in this case produces a structure in which the metal and metal fluoride are uniformly dispersed. Furthermore, numerous voids are present in this fluoride. Specifically, as was described above, a layer that does not impede the pulsed power discharge current is formed. Furthermore, since a mixed-material film is present on the discharge parts of the electrodes, there is no stripping of the metal fluoride even if the electrodes are fluorinated.

As a result of the progress of the abovementioned phenomena, the substance formed as a coating film on the electrode discharge parts and the electrode matrix material itself are gradually fluorinated. However, this case differs from the universally known case in the electrodes with the following properties can be realized:

1. There is almost no fluctuation in the shape of the outermost surfaces of the electrodes.
2. There is almost no consumption of the electrodes, so that the distance between the electrodes shows almost no fluctuation.
3. The electrode discharge parts are modified uniformly in the longitudinal direction of the electrodes.

BRIEF DESCRIPTION OF THE DRAWINGS

FIG. 2A is a sectional view of the main discharge electrode 3 as seen from the longitudinal direction, and FIG. 2B is a sectional view along line X—X of the main discharge electrode 3 shown in FIG. 2A;

FIGS. 10A through 10C are diagrams that are used to illustrate phenomena that occur at the surface of the discharge part 3a;

FIGS. 16A through 16D show types 1 through 4 of the distribution of the conductor and insulator;

FIGS. 17A through 17H show types 1 through 8 of the thickness of the film;

FIGS. 18A through 18E show types 1 through 5 of the partially formed film;

DESCRIPTION OF THE PREFERRED EMBODIMENTS

Embodiments of the present invention will be described below with reference to the attached figures.

Below, furthermore, an excimer laser apparatus and a fluorine molecular laser apparatus will both be called a "gas laser apparatus". First, the construction of such a gas laser apparatus will be described.

Figure 1A:
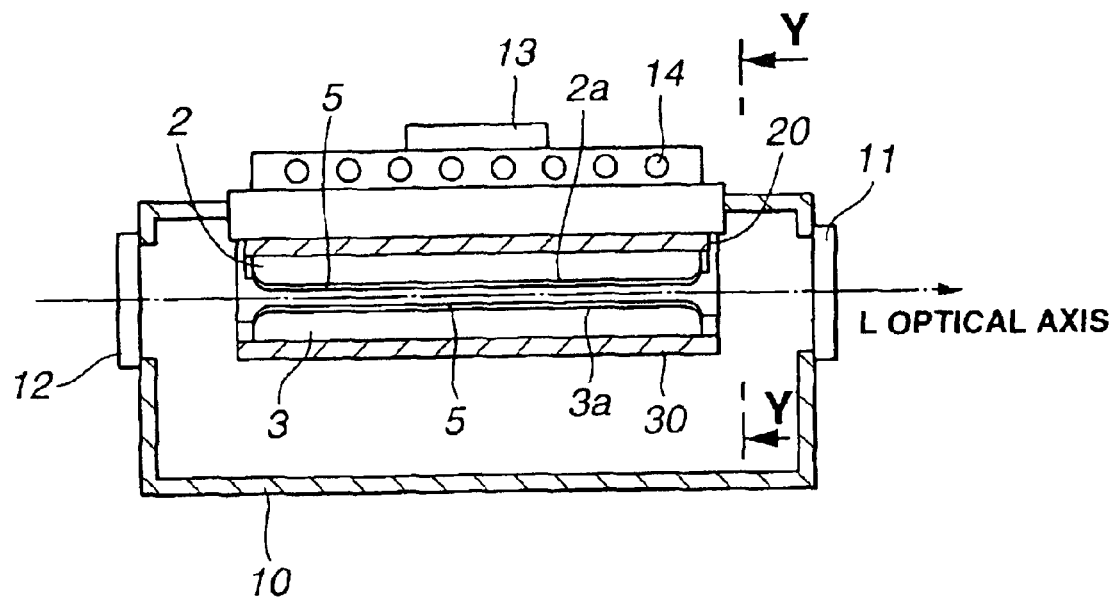
FIG. 1A is a sectional views which show the interior of the gas laser apparatus as seen from a direction perpendicular to the longitudinal direction.
Figure 1B:
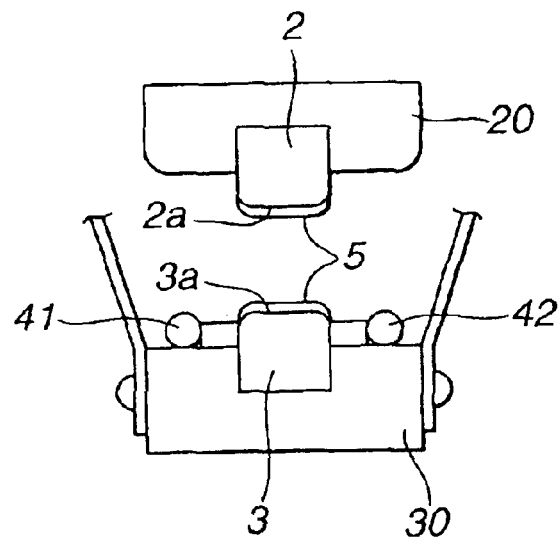
FIG. 1B is a sectional view along line Y—Y of the area around the main discharge electrodes in FIG. 1A.

FIG. 1A is a sectional view which shows the interior of the gas laser apparatus as seen from a direction perpendicular to the longitudinal direction, and FIG. 1B is a sectional view along line Y—Y of the area around the main discharge electrodes in FIG. 1A.

The laser chamber 10 is a vessel in which the interior walls are constructed by (for example) plating aluminum with a nickel plating. In this laser chamber 10, respective windows 11 and 12 are formed in both end surfaces facing the optical axis L. The windows 11 and 12 are windows that allow the passage of laser light between the interior and exterior of the laser chamber 10.

A pair of electrode holders 20 and 30 are installed in positions above and below the optical axis L inside the laser chamber 10. A cathode main discharge electrode 2 is held in the electrode holder 20, and an anode main discharge electrode 3 is held in the electrode holder 30. Discharge parts 2a and 3a where a discharge is performed face each other across the optical axis L. A film 5 is formed on the discharge parts 2a and 3a in order to prevent deterioration caused by the main discharge. This film 5 will be described later.

Preparatory dissociation electrodes 41 and 42 are installed along the longitudinal direction in the vicinity of the main discharge electrode 3. Furthermore, a peaking capacitor 14 which is connected to a power supply via a connecting part 13 is installed in the upper part of the laser chamber 10 on the side of the main discharge electrode 2.

A laser gas comprised of a rare gas and a halogen gas is sealed inside the laser chamber 10. For example, a mixed gas in which a krypton-fluorine (KrF) gas comprised of the rare gas krypton (Kr) and halogen gas fluorine ($F_2$), an argon-fluorine (ArF) gas comprised of the rare gas argon (Ar) and halogen gas fluorine ($F_2$), a xenon-chloride (XeCl) gas comprised of the rare gas xenon (Xe) and halogen gas hydrogen chloride (HCl) or the like is mixed with a buffer gas such as neon (Ne) or the like is used.

The laser oscillation performed by the gas laser apparatus shown in FIG. 1A will be described.

When a voltage is applied to the preparatory dissociation electrodes 41 and 42, a corona discharge is generated at the surfaces of the preparatory dissociation electrodes 41 and 42. The laser gas between the main discharge electrodes 2 and 3 is preparatorily dissociated by this corona discharge.

Meanwhile, the voltage V of the peaking capacitor rises as charging progresses. When this voltage V reaches a specified main discharge initiation voltage, the insulation of the laser gas between the main discharge electrodes 2 and 3 breaks down so that a main discharge occurs. The laser gas is excited by this main discharge so that laser light is generated. This laser light is emitted to the outside of the laser chamber 10 via the windows 11 and 12.

The structure described above is the basic structure of the gas laser device.

In the present invention, a specified film is artificially formed on the discharge parts of the main discharge electrodes in the gas laser apparatus. The history that led to the formation of this film is important in explaining the present invention; accordingly, this history will be described before respective embodiments are described.

Figure 9C:
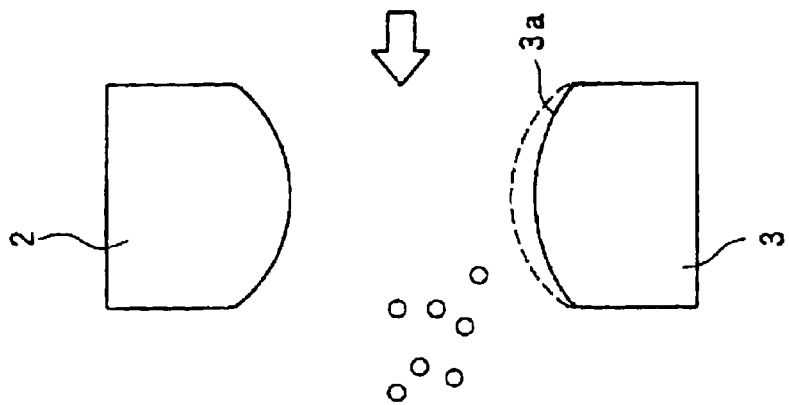
FIGS. 9A through 9C are sectional views of the main discharge electrodes 2 and 3 in the gas laser apparatus as seen from the longitudinal direction.
Figure 9B:
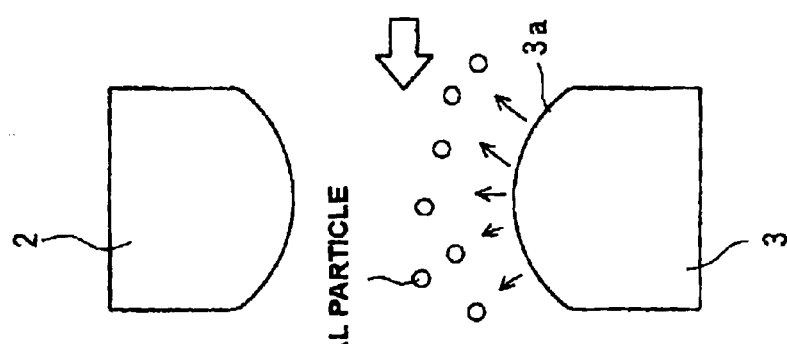
Figure 9A:
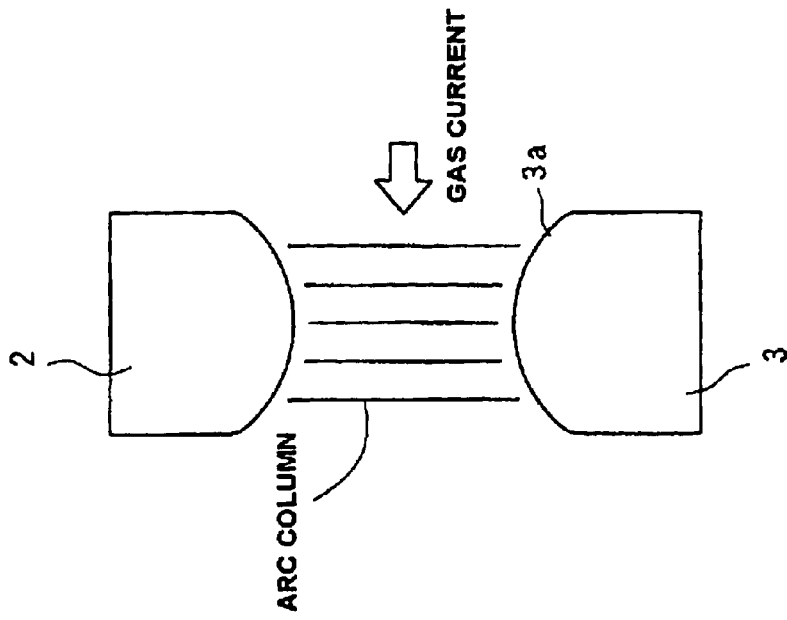

FIGS. 9A through 9C are sectional views of the main discharge electrodes 2 and 3 in the gas laser apparatus as seen from the longitudinal direction. These figures are used to explain the phenomena that occur between the main discharge electrodes 2 and 3 when a discharge takes place. Furthermore, the term "direction of width" used below refers to the direction of width of these main discharge electrodes 2 and 3.

When the laser gas between the main discharge electrodes 2 and 3 reaches the point of insulation breakdown, a spark jumps between the main discharge electrode 3 on the anode side and the main discharge electrode 2 on the cathode side. This spark constitutes a slender arc column (a flow of current with an extremely high current density), and strikes the main discharge electrode 3 on the anode side. In order to generate an arc column in a uniform manner with respect to the direction of width of the main discharge electrodes 2 and 3, the discharge parts 2a and 3a of the main discharge electrodes 2 and 3 are formed with an appropriate curvature.

Accordingly, the discharge part 3a of the main discharge electrode 3 is struck more or less uniformly. Since this flow of electrons generates heat, the discharge part 3a of the main discharge electrode 3 reaches an extremely high temperature, so that the metal on the surface is evaporated or melted. Furthermore, the vaporized metal particles and electron current collide so that ions are generated, and the main discharge electrode 3 is also heated by these ions.

A cross-flow fan (not shown in the figures) is installed inside the laser chamber. As is indicated by the arrows in FIGS. 9A through 9C, the laser gas is circulated in the direction perpendicular to the longitudinal direction between the main discharge electrodes 2 and 3 by the cross-flow fan. The metal particles that are blown away as vaporized metal particles and molten fragments are caused to flow by this laser gas flow. Some of the metal particles float through the laser chamber, while some of the metal particles adhere to the inside walls of the laser chamber and other metal particles are captured by a filter unit (not shown in the figures).

When the striking of the main discharge electrode 3 by the electron current is examined on a microscopic scale, it is seen that a molten pond is formed on the discharge part 3a of the main discharge electrode 3 as shown in FIGS. 10A through 10C, and that metal particles are evaporated or blown away as molten fragments from this molten pond. The molten pond forms working scars caused by portions that are blown away as molten fragments and portions that are piled up by the heat, so that the surface as a whole becomes rough. Meanwhile, when the striking of the main discharge electrode 3 by the electron current is examined on a macroscopic scale, it is seen that if the electron current is uniform, the discharge part 3a of the main discharge electrode 3 shrinks in a uniform manner as shown in FIG. 9C.

The abovementioned description refers to phenomena that occur in a single pulse discharged; however, in the case of an actual gas laser, repeated pulse discharges are performed. In the case of such repeated pulse discharges, if the vaporized metal particles and metal particles that are blown away as molten fragments are not flushed away by the gas current, but instead remain between the main discharge electrodes 2 and 3, the necessary insulation cannot be obtained at the time of the next pulse discharge. As a result, the energy with which the capacitor between the main discharge electrodes 2 and 3 is charged is reduced, so that the output energy in the next pulse discharge is reduced. Thus, in the case of repeated pulse discharges, there is a variation in the output energy of each pulse as a result of metal particles remaining between the main discharge electrodes 2 and 3.

In the case of an ordinary gas laser apparatus, the degree of variation in the output energy is strictly controlled, and this degree of variation is stipulated in accordance with the application in which the gas laser apparatus is being used. However, a gas laser apparatus may be viewed as an apparatus that does not operate normally in cases where a variation in the output energy is generated at the repetition frequency at which such phenomena occur. Accordingly, it is necessary to prevent metal particles from remaining in the area between the main discharge electrodes 2 and 3 by designing the laser chamber so that a gas flow velocity corresponding to the repetition frequency can be obtained.

Furthermore, In the case of repeated pulse discharges, the discharge part 3a shrinks further with each pulse. Accordingly, the shrinkage of the discharge part 3a is in a proportional relationship with the number of pulses.

The initial shape of the discharge parts 2a and 3a is determined by electric field calculations so that the electron density in the arc column that is generated between the main discharge electrodes 2 and 3 is uniform. In cases where this electron density is uniform, a single pulse discharge causes the discharge part 3a to shrink while retaining its initial shape. When a discharge is performed between the main discharge electrodes 2 and 3, the heat distribution of the discharge part 3a is such that the temperature is higher in the central portion (with respect to the direction of width) than in the end portions. When the frequency is increased in repeated pulse discharges, the heat distribution generated by the previous pulse discharges is maintained in the electrode as a whole. This heat distribution is further promoted by the abovementioned ions (or plasma). As a result, evaporation and melting of the metal are accelerated in the central portion of the discharge part 3a. Accordingly, as the number of pulses increased, shrinkage becomes greatest in the central portion of the discharge part 3a.

Figure 11A:
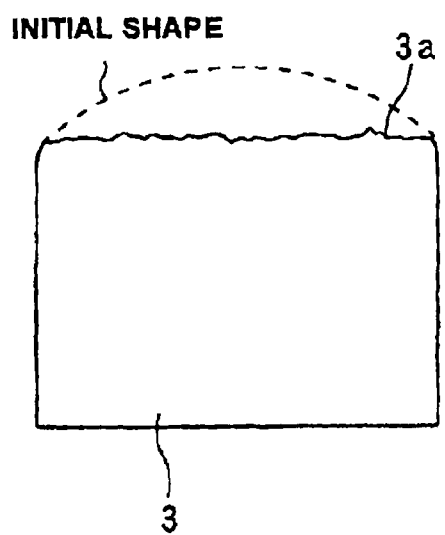
FIG. 11A is a diagram that shows the main discharge electrode 3 on the anode side following repeated pulse discharges.
Figure 11B:
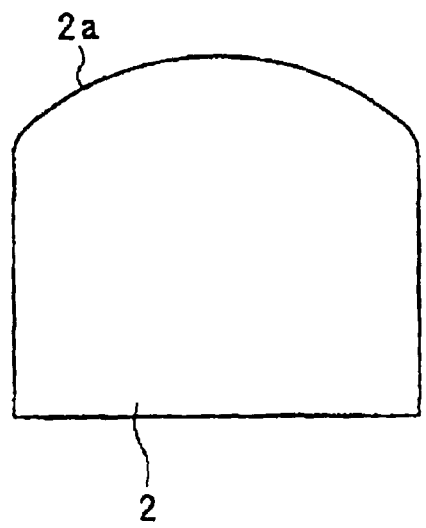
FIG. 11B is a diagram that shows the main discharge electrode 2 on the cathode side following repeated pulse discharges.

FIG. 11A is a diagram which shows the main discharge electrode 3 on the anode side following repeated pulse discharges, and FIG. 11B is a diagram which shows the main discharge electrode 2 on the cathode side following repeated pulse discharges. As a result of repeated pulse discharges, the shrinkage of the discharge part 3a progresses, so that the discharge part 3a becomes more or less flat. On the other hand, since shrinkage does not progress in the discharge part 2a, the curvature of the initial shape of this discharge part 2a is maintained.

When the discharge part 3a of the main discharge electrode 3 shrinks so that there is a change from the initial shape, the electron density distribution in the arc column created by the discharge varies. As a result, the uniformity of the beam profile of the output laser light is lost, and the laser output drops.

The causes of the drop in the laser output may be explained as follows: for example, this problem is considered in terms of main discharge electrodes 2 and 3 such as those shown in FIGS. 11A and 11B. Before shrinkage of the discharge part 3a progresses, an arc column that is uniform in the direction of width of the discharge part 3a, and the beam profile has more or less the same columnar shape. After shrinkage of the discharge part 3a has progressed, an arc column that is concentrated in the central portion of the discharge part 3a is formed, so that the beam profile becomes more slender. It is thought that this results from the fact that while the concentration of the electric field in the central portion of the discharge part 3 is inhibited by the maintenance of the curvature in the initial shape of the discharge part 3a, the substantial flattening of the discharge part 3a causes the electric field to be concentrated in the central portion of the discharge part 3a. Furthermore, the output energy is in a proportional relationship with the discharge area, sot that if the discharge area in the direction of width of the main discharge electrode 3 is large, the output energy is also large. Accordingly, it is thought that if the electric field is concentrated in the central portion of the discharge part 3a, the discharge area is reduced in size, so that the laser output drops. Furthermore, it is also thought that since the gap between the main discharge electrodes 2 and 3 is increased by the shrinkage of the discharge part 3a, the balance of the discharge conditions is destroyed, so that the laser output drops.

When the output energy falls below a stipulated value, it is considered that the useful life of the main discharge electrode 3 has ended, and it is necessary to replace the main discharge electrode 3. When electrodes are replaced, the laser chamber as a whole must be reassembled, and in some cases, the laser chamber itself must be replaced. Thus, the replacement interval of the main discharge electrode 3 is also the maintenance interval of the gas laser apparatus. In other words, the maintenance interval of the gas laser apparatus can be extended by inhibiting the shrinkage of the discharge part 3a, so that maintenance costs can be reduced.

Accordingly, as a result of various experiments, a phenomenon that is effective in inhibiting the shrinkage of the discharge part 3a was discovered. Specifically, taking electrical conductivity, thermal conductivity, halogen resistance, sputtering resistance and the like into consideration, copper is employed as the material of the main discharge electrodes 2 and 3.

Figure 12A:
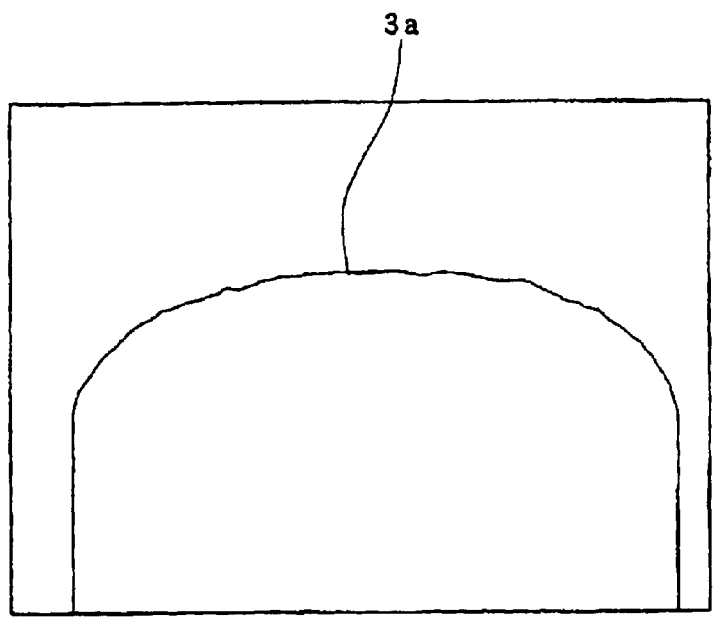
FIGS. 12A and 12b are sectional views of the main discharge electrode 3 before and after repeated pulse discharges, as seen from the longitudinal direction.
Figure 12B:
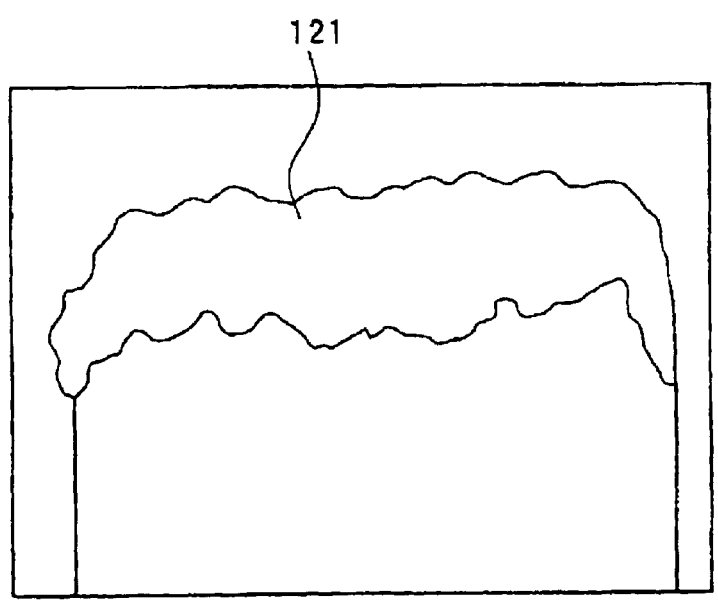

FIG. 12A is a sectional view of a main discharge electrode comprised of copper, as seen from the longitudinal direction. In cases where fluorine is contained nanotube he laser gas, if laser oscillation is continued under certain conditions, the discharge part 3a of the main discharge electrode 3 reacts with the fluorine. As a result, the discharge part 3a and the areas around this discharge part 3a are converted into a thick insulator film 121 as shown in FIG. 12B. Analysis of this insulator has indicated that the insulator comprises copper fluoride. Furthermore, this insulator film 121 functions as a protective film that protects the discharge part 3a, and it has been confirmed that shrinkage of the discharge part 3a is inhibited by this film. Hereafter, in the present specification, this insulator film will be called a "fluorine compound".

The reason that a fluorine compound is effective in preventing shrinkage of the electrode is not completely understood; however, the reason is thought to be as follows:

A fluorination passivation treatment in which a fluoride film is formed on the surfaces of materials used in a halogen gas atmosphere for the purpose of preventing corrosion of these materials is a universally known technique. This fluorination passivation treatment is performed by exposing the heated object material to a high concentration of fluorine. For example, in cases where a fluoride film is to be formed on a piping part or laser chamber vessel that handles a halogen gas, this treatment is accomplished by a method in which a heater is wrapped around the piping or vessel, and the piping or vessel is then exposed to a fluorine gas atmosphere. The fluoride film that is thus formed on the surface of the material serves as a chemical protective film that prevents erosion by halogen molecules (fluorine or chlorine). A thick fluoride film is considered desirable in order to increase the erosion resistance, and such a thick fluoride film can be formed by increasing the heating temperature or the object material and the fluorine concentration.

However, in the case of the abovementioned method, it is difficult to increase the heating temperature of the piping part or laser chamber vessel. Accordingly, in actuality, a treatment is performed by a method in which the respective parts are heated in an oven prior to assembly in order to increase the erosion resistance. If such a method is used, the fluorine concentration and heating temperature can be arbitrarily adjusted, so that each material can be treated under optimal conditions. In the case of methods using a heater, an ultra-thin fluoride film (several tens of angstroms to several thousand angstroms) can be formed, while in the case of methods using an oven, a fluoride film on the order of several microns is formed. A fluoride film on the order of several microns can function adequately in terms of erosion resistance.

Considering a case in which a fluorination passivation treatment is applied to the main discharge electrode 3, the fluoride film that is formed must have the function of being able to withstand a temperature rise in the electrode surface on which the arc column is formed, and the function of being able to withstand impact by the pressure that is generated when the material is removed, in addition to possessing resistance to erosion by halogen gases. The fluoride film that is formed in the case of methods using an oven is generally approximately 2 to 3 times that of an ordinary metal, and the melting point is approximately 1.5 times that of an ordinary metal. Thus, the fluoride film that is formed in the case of methods using an oven has a higher hardness and a higher melting point than the metal electrode, and may therefore be the to be suitable for use in protection of the electrode.

However, in the case of a fluoride film with a thickness on the order of several microns, there is a possibility that the film may be instantaneously blown away when a discharge occurs. Accordingly, the fluoride film must have a thickness that is sufficient for the desired protection of the electrode.

On the other hand, there are also problems in the case of a thick fluoride film. Since the fluoride film is an insulator, the electrical resistance that is present when a discharge occurs is large. Since the discharge that is generated is a pulse-form discharge, this electrical resistance may be viewed in electrical terms as an alternating-current waveform. Accordingly, in a powered state, the fluoride film may be viewed as functioning as a capacitor, with the electrical resistance increasing as the thickness of the fluoride film increases, or as the pulse width increases. When this electrical resistance is large, a discharge loss is generated between the main discharge electrodes 2 and 3, which ultimately becomes heat inside the chamber. If the gas laser apparatus is operated in this state, the output efficiency relative to the input energy of the laser will drop.

Taking these facts into account, the lower limit on the thickness of the fluoride film is set at a value that is sufficient to prevent the fluoride film from being blown away by the discharge, and the upper limit on this thickness is set at a value that is small enough to ensure that there is no drop in the output efficiency caused by the electrical resistance that occurs when a discharge is generated between the main discharge electrodes 2 and 3. In concrete terms, it appears from experimental results that a thickness of several hundred microns to several millimeters is appropriate.

Furthermore, the reason that a fluorine compound is formed is likewise not completely understood. However, it has been ascertained that there is a correlation between the fluorine concentration in the laser gas inside the laser chamber and the fluorine compound. It has been ascertained that a fluorine compound tends to be formed in cases where the fluorine concentration is high, while almost no fluorine compound is formed in cases where the fluorine concentration is low. The fluoride film is formed as a result of the gradual progress of a reaction between the fluorine in the laser gas and the discharge part 3a. In cases where the fluorine concentration is low, the rate at which this reaction proceeds is slow, so that the fluoride film is blown away by melting and evaporation that occur at the surface of the discharge part 3a. In cases where the fluorine concentration is high, the rate at which the abovementioned reaction proceeds is rapid, so that the film thickness progressively increases before the fluoride film can be blown away. In this case, fluorination proceeds at the contact surfaces of the discharge part 3a and the fluoride film.

Here, since the fluoride film, as an insulating layer, plays the role of a capacitor, a flow of electrons also occurs between the contact surfaces of the discharge part 3a and fluoride film. In the case of a method in which the fluoride film is formed using an oven, the thickness and other properties of the fluoride film can be varied by appropriately selecting the heating temperature and fluorine concentration as parameters. On the other hand, it appears that in the formation process of the fluorine compound, the state of the contact surfaces of the discharge part 3a and fluoride film promote fluorination in addition to the heating temperature and fluorine concentration. Accordingly, it appears that a thick fluoride film can be formed by adjusting these conditions.

However, the following problems (1) through (3) are encountered in the arbitrary formation of a thick fluorine compound:

(1) Numerous pulses of laser irradiation are required in order to form a thick fluorine compound. Accordingly, a pre-treatment process known as "passivation" must be performed to an extent that is several times that of an ordinary pre-treatment process. Furthermore, since shrinkage of the discharge part 3a also occurs simultaneously until the fluorine compound is formed, the laser characteristics in the initial stage cannot be controlled.

(2) The thickness of the fluorine compound is determined by the conditions of the discharge. Accordingly, the uniformity of the discharge must be maintained, and the discharge must be performed with various parameters such as the distribution of impurities in the electrode material and the like being taken into account. In actuality, however, it is impossible to control these parameters. Accordingly, a fluorine compound with a uniform thickness cannot be formed.

(3) In order to form a thick fluorine compound while operating the gas laser apparatus, it is necessary to increase the fluorine concentration in the laser gas. On the other hand, there is a correlation between the fluorine concentration in the laser gas and the line width of the laser light, so that if the fluorine concentration is increased, the line width of the laser light is increased. In cases where a gas laser apparatus is used as a light source for the exposure of semiconductor substrates, it is necessary that the line width of the laser light be as small as possible; accordingly, it is extremely difficult to adjust the fluorine concentration to a high value.

In spite of the fact that the abovementioned fluorine compound was a break-through discovery for inhibiting the shrinkage of the discharge part 3a, this fluorine compound could not be employed in technical applications because of the abovementioned problems (1) through (3).

Accordingly, a technique in which a protective film that has the same function as a fluorine compound is artificially formed instead of a fluorine compound attracted attention. A protective film that inhibits the shrinkage of the discharge part 3a must have a sufficient hardness and a high melting point; in addition, a sufficient thickness, i.e., strength, is a required condition. A further necessary condition is that the film maintain its function as a protective film that protects the discharge part 3a until the desired time for electrode replacement is reached. Even if the protective film degenerates as a result of the effects of numerous pulse discharges and heat, there is no problem as long as the abovementioned necessary conditions are satisfied.

Using such an approach, experiments were performed in which insulators and mixed materials containing insulators and conductors or the like were formed as films on the discharge part 3a. As a result, a protective film that satisfied the abovementioned necessary conditions was discovered by appropriately selecting the materials used, and appropriately devising the mixture ratios of the materials and the structure of the film.

Accordingly, the film 5 that is formed on the discharge parts 2a and 3a of the main discharge electrodes 2 and 3 will be described. Here, the film that is formed on the main discharge electrode 3 on the anode side will be described; however, this description also applies to the film that is formed on the main discharge electrode 2 on the cathode side.

A case in which the film 5 is formed from an insulator 51 will be described as a first embodiment.

FIG. 2A shows a sectional view of the main discharge electrode 3 as seen from the longitudinal direction, and FIG. 2B shows a sectional view along line X—X of the main discharge electrode 3 shown in FIG. 2A.

A metal is used for the main discharge electrode 3 as a substance that has a high melting point, high hardness, high electrical conductivity and high thermal conductivity. Concrete examples of metals that are candidates for use include aluminum, nickel, brass, copper, iron, stainless steel, cobalt, tungsten, silver, molybdenum, tantalum, platinum and the like; however, the present invention is not limited to these metals.

A film-form insulator 51 is formed on the discharge part 3a of the main discharge electrode 3. This insulator 51 is formed with a thickness that makes it possible to prevent erosion of the discharge part 3a by the halogen gas contained in the laser gas and deformation of the discharge part 3 by the bombardment and heat of the main discharge, and that also makes it possible to maintain electrical conductivity (in other words, a thickness that allows a main discharge to be generated between the main discharge electrodes 2 and 3). For example, a desired value in the range of 0.005 mm to 1.5 mm, preferably 0.1 mm to 1 mm, is appropriate as this thickness. Furthermore, a desired value in the permissible range is selected as the thickness of the insulator 51 in accordance with the material of the insulator.

In order to prevent erosion of the discharge part 3a by the halogen gas, it is necessary that the insulator 51 be a substance that tends not to react with the halogen gas, i.e., a halogen-resistant substance.

Examples of such halogen-resistant substances include oxides such as alumina (aluminum oxide) and the like, nitrides such as aluminum nitride and the like, fluorides such as copper fluoride, calcium fluoride, magnesium fluoride, aluminum fluoride, sodium fluoride, potassium fluoride and the like, and chlorides such as sodium chloride, aluminum chloride, potassium chloride and the like. In cases where a fluorine type gas is used as the halogen gas, an insulator comprised of an oxide, nitride or fluoride is used, and in cases where a chlorine type gas is used as the halogen gas, an insulator comprised of an oxide, nitride or chloride is used.

Furthermore, in order to prevent the deformation of the electrode part 3a by the bombardment or heat of the main discharge, it is necessary that the insulator 51 be a substance that has a higher hardness than the metal of the main discharge electrode 3, or a substance that has a higher melting point than the metal of the main discharge electrode 3. Accordingly, the type of insulator 51 that forms the film 5 is selected in accordance with the hardness and melting point of the metal of the main discharge electrode 3.

For example, in a case where the main discharge electrode 3 is made of copper, it is advisable to use alumina as the insulator 51. The hardness of alumina is higher than the hardness of copper. Furthermore, while the melting point of copper is approximately 1080° C., the melting point of alumina is approximately 2000° C. Furthermore, in a case where the main discharge electrode 3 is made of copper, aluminum nitride may also be used as the insulator 51.

In regard to the method that is used to form the insulator 51 on the discharge part 3a of the main discharge electrode 3, it is convenient to use a method that is commonly used for coatings and the like, e.g., a flame coating method in which the film 5 is formed by blowing the insulator onto the discharge part 3a together with a high-temperature gas while the insulator is melted, a plasma flame coating method in which the film 5 is formed by using the ultra-high temperature of a plasma to simultaneously melt a powder of the insulator and blow this molten insulator onto the discharge part 3a, or an explosive flame coating method in which the film 5 is formed in acetylene gas by exploding the acetylene gas so that the insulator is melted and applied to the discharge part 3a by the explosive force. Furthermore, the insulator 51 can also be formed by thin-film deposition such as a sputtering process, metal vacuum evaporation process or the like.

When the insulator 51 is formed by these methods, there is a danger that impurities such as oxygen, carbon and the like will be mixed with the insulator 51. The permissible amount of impurities contained in the insulator 51 is 1% or less, preferably 0.01% or less. The smaller the amount of impurities, the better, and a complete absence of impurities is ideal. Accordingly, it is advisable to form the insulator in a rare gas or nitrogen gas, or in a reduced-pressure atmosphere. In a rare gas or nitrogen gas, or in a reduced-pressure atmosphere, cleanness can be maintained, so that the mixture of impurities in the insulator 51 can be prevented.

In the first embodiment, a main discharge is performed between the main discharge electrodes 2 and 3 in which an insulator 51 is formed on the discharge parts 2a and 3a. In this case, the erosion by the halogen gas and the bombardment and heat that accompany the main discharge are absorbed by the insulator 51, so that there is no effect on the discharge parts 2a and 3a. Accordingly, deterioration of the main discharge electrodes 2 and 3 is inhibited, so that a stable laser output can be obtained.

Furthermore, since the main discharge is performed via the insulator 51, the impact of the main discharge itself can be reduced, so that consumption of the insulator 51 itself can be inhibited. Accordingly, the main discharge electrodes 2 and 3 have a long useful life.

Next, a case in which the film 5 is formed by a mixture 52 in which the mixture proportions of an insulator and a conductor are uniform will be described as a second embodiment.

Figure 3B:
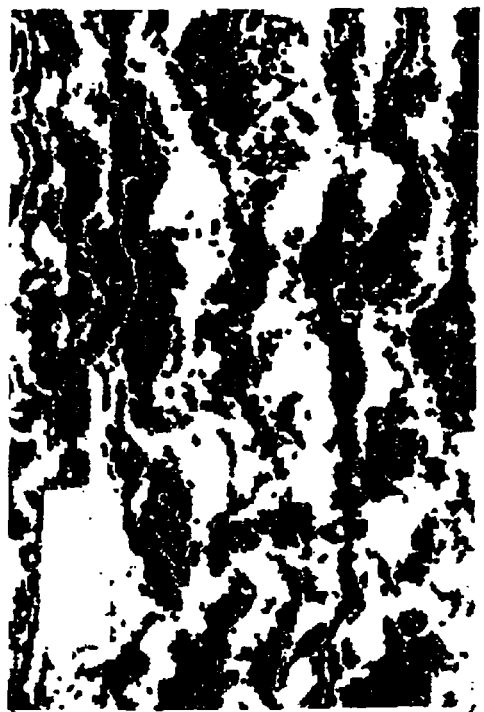
FIGS. 3B and 3C are enlarged sectional views of the mixture 52.
Figure 3C:
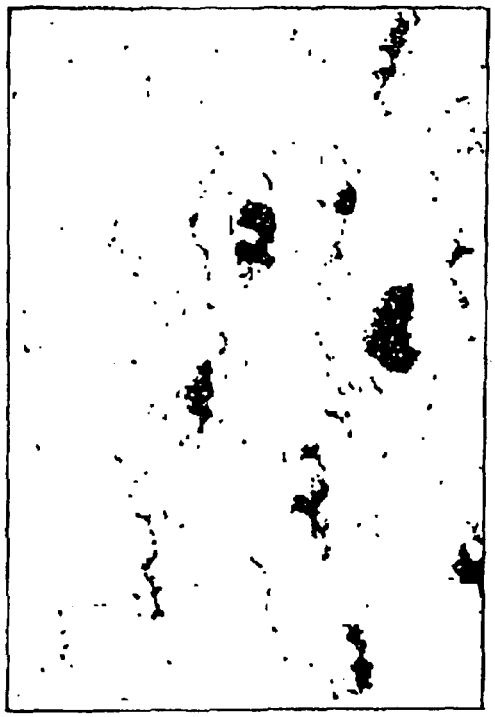
Figure 3A:
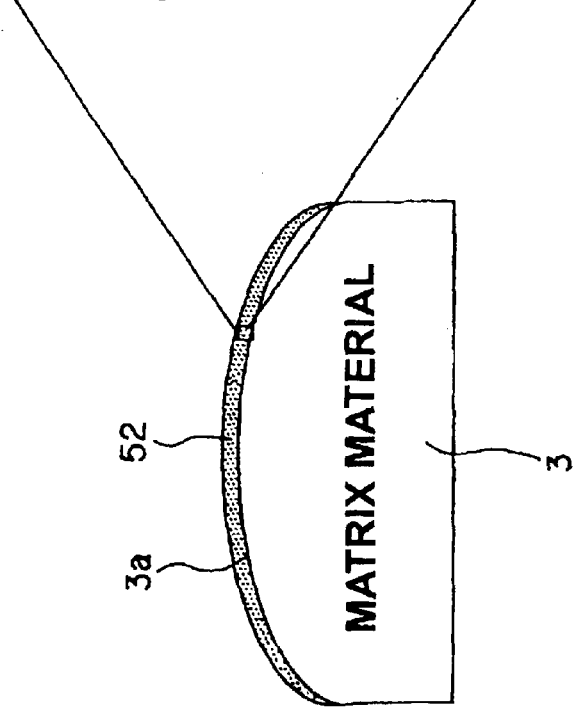
FIG. 3A is a sectional view of the main discharge electrode 3 as seen from the longitudinal direction.

FIG. 3A shows a sectional view of the main discharge electrode 3 as seen from the longitudinal direction, and FIGS. 3B and 3C show enlarged sectional views of the mixture 52. In FIGS. 3B and 3C, the black portions indicate the insulator, and the white portions indicate the conductor. Furthermore, FIG. 3C shows a mixture in which the proportion of the conductor is greater than in the mixture shown in FIG. 3B.

The thicknesses of the material of the main discharge electrode 3 and the mixture 52 shown in FIG. 3A are the same as in a case in which the insulator 51 shown in FIG. 2 is formed on the discharge part 3a of the main discharge electrode 3. Accordingly, individual descriptions will be omitted.

A film-form mixture 52 is formed on the discharge part of the main discharge electrode 3. The mixture 52 comprises an insulator and a conductor. The same substance as the abovementioned insulator 51 may be cited as an example of the insulator. It is desirable that the conductor be the same type of substance as the matrix material; however, a different type of substance may also be used. If an insulator or conductor that has a higher halogen resistance and a higher hardness than the metal of the main discharge electrode 3 is used, then the mixture 52 will have a higher halogen resistance and higher hardness than the metal of the main discharge electrode 3. If an insulator or conductor that has a higher halogen resistance and a higher melting point than the metal of the main discharge electrode 3 is used, then the mixture 52 will have a higher halogen resistance and higher melting point than the metal of the main discharge electrode 3.

Furthermore, it is also possible to use a substance that is in itself a mixture of an insulator and a conductor, such as alumina-dispersed reinforced copper or the like, instead of forming a mixture by mixing an insulator and a conductor.

The mixture 52 is formed on the discharge part 3a by a flame coating method, a plasma flame coating method, an explosive flame coating method, a sputtering method, a metal vacuum evaporation method or the like. In the present embodiment, as is shown in FIGS. 3B and 3C, the mixture ratio of the insulator and conductor is set so that this ratio is more or less uniform throughout the entire film. It is desirable that the mixture ratio of the insulator and conductor be set at a weight ratio of approximately 1:1. However, the mass vanes according to the substances used. As a result, if the abovementioned weight ratio is set at 1:1, there may be cases in which the volume difference between the insulator and conductor is large, which is undesirable. Accordingly, the mixture ratio is appropriately set in a weight ratio range of 3:7 to 7:3 in accordance with the masses of the insulator and conductor. For example, in the case of a mixture of alumina and copper, the weight ratio is set at approximately 4 parts of alumina to 6 parts of copper.

In the second embodiment, a main discharge is performed between the main discharge electrodes 2 and 3 in which the abovementioned mixture 52 is formed on the discharge parts 2a and 3a. In this case, since the erosion by the halogen gas and the bombardment and heat that accompany the main discharge are absorbed by the mixture 52, there is no effect on the discharge parts 2a and 3a. Accordingly, deterioration of the main discharge electrodes 2 and 3 is inhibited, so that a stable laser output can be obtained.

Furthermore, since a conductor is mixed with the mixture 52, the resistance between the main discharge electrodes 2 and 3 is lower than in the first embodiment. Accordingly, the laser output is increased.

Next, a case in which the abovementioned film 5 is formed by a mixture 53 in which layers of an insulator and layers of a conductor are alternately laminated will be described as a third embodiment.

Figure 4B:
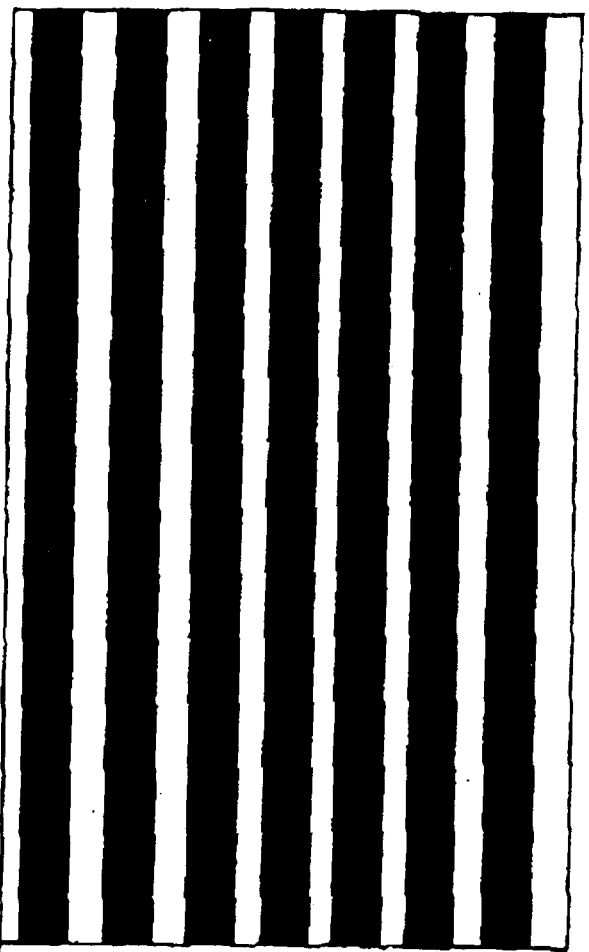
FIG. 4B is an enlarged sectional view of the mixture 53.
Figure 4A:
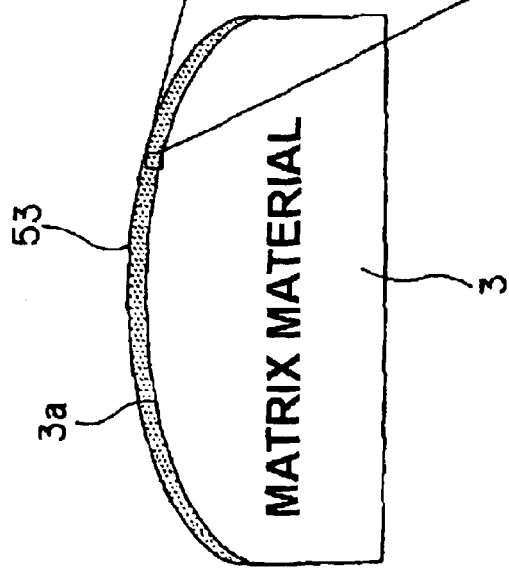
FIG. 4A is a sectional view of the main discharge electrode 3 as seen from the longitudinal direction.

FIG. 4A shows a sectional view of the main discharge electrode 3 as seen from the longitudinal direction, and FIG. 4B shows an enlarged sectional view of the mixture 53. In FIG. 4B, the black portions indicate the insulator, and the white portions indicate the conductor.

The material of the main discharge electrode 3 and the thickness of the mixture 53 shown in FIG. 4A are the same as in a case in which the insulator 51 shown in FIG. 2 is formed on the discharge part 3a of the main discharge electrode 3. Accordingly, individual descriptions will be omitted.

A film-form mixture 53 is formed on the discharge part 3a of the main discharge electrode 3. This mixture 53 is a mixture in which layers of an insulator and layers of a conductor are alternately laminated. The same substance as the abovementioned insulator 51 may be cited as an example of this insulator. It is desirable that the conductor be the same type of substance as the matrix material; however, a different type of substance may also be used. If an insulator or conductor that has a higher halogen resistance and a higher hardness than the metal of the main discharge electrode 3 is used, then the insulator layers or conductor layers will have a higher halogen resistance and higher hardness than the metal of the main discharge electrode 3. If an insulator or conductor that has a higher halogen resistance and a higher melting point than the metal of the main discharge electrode 3 is used, then the insulator layers or conductor layers will have a higher halogen resistance and higher melting point than the metal of the main discharge electrode 3.

The mixture 53 is formed on the discharge part 3a by a flame coating method, a plasma flame coating method, an explosive flame coating method, a sputtering method, a metal vacuum evaporation method or the like. The formation of insulator layers and the formation of conductor layers are alternately performed so that insulator layers and conductor layers are alternately stacked. The thicknesses of the individual layers and the numbers of layers are arbitrary.

In the third embodiment, a main discharge is performed between the main discharge electrodes 2 and 3 in which the abovementioned mixture 53 is formed on the discharge parts 2a and 3a. In this case, since the erosion by the halogen gas and the bombardment and heat that accompany the main discharge are absorbed by the mixture 53, there is no effect on the discharge parts 2a and 3a. Accordingly, deterioration of the main discharge electrodes 2 and 3 is inhibited, so that a stable laser output can be obtained.

As the main discharge is repeated between the main discharge electrodes 2 and 3, the mixture 53 itself is consumed. This consumption of the mixture occurs as a result of the layer that is exposed at the surface of the mixture 53 being stripped away from the underlying layers. Accordingly, as a result of the consumption of the mixture 53, conductor layers and insulator layers are alternately exposed at the surface of the mixture 53. In cases where a conductor layer is exposed at the surface of the mixture 53, the laser output differs from that obtained in cases where an insulator layer is exposed at the surface of the mixture 53. Accordingly, if the number of laminated layers is known beforehand, the useful life of the mixture 53 itself can be ascertained by detecting the variation in the laser output.

Next, a case in which the abovementioned film 5 is formed by a mixture 54 in which the mixture ratio of the insulator and conductor is varied will be described as a fourth embodiment.

Figure 5B:
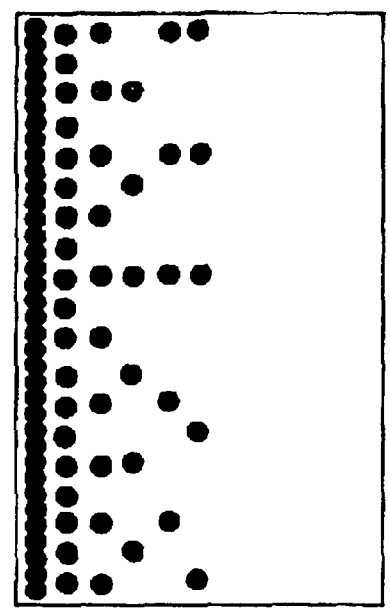
FIGS. 5B and 5C are enlarged sectional views of the mixture 54.
Figure 5C:
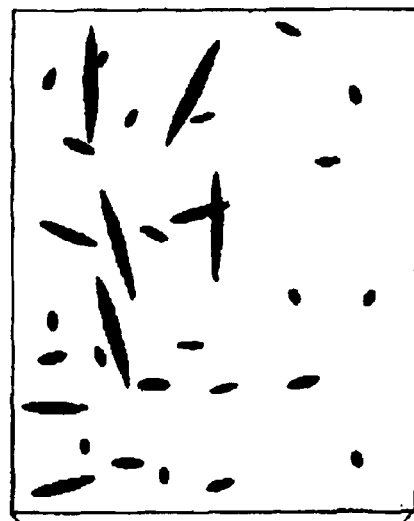
Figure 5A:
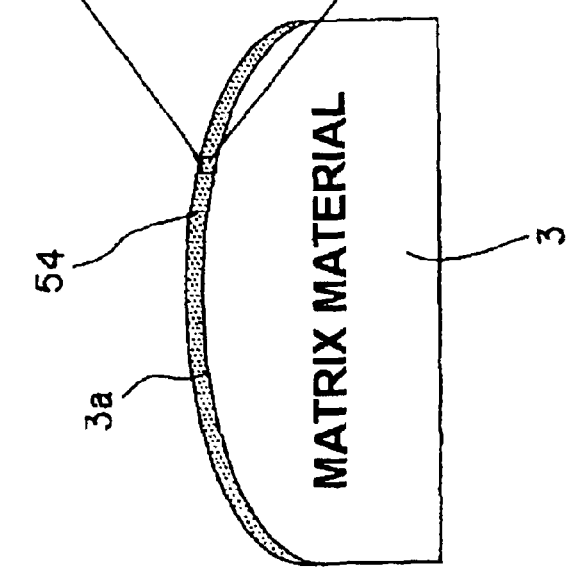
FIG. 5A is a sectional view of the main discharge electrode 3 as seen from the longitudinal direction.

FIG. 5A shows a sectional view of the main discharge electrode 3 as seen from the longitudinal direction, and FIGS. 5B and 5C show enlarged sectional views of the mixture 54. In FIGS. 5B and 5C, the black portions indicate the insulator, and the white portions indicate the conductor.

The material of the main discharge electrode 3 and the thickness of the mixture 54 shown in FIG. 5A are the same as in a case in which the insulator 51 shown in FIG. 2 is formed on the discharge part 3a of the main discharge electrode 3. Accordingly, individual descriptions will be omitted.

A film-form mixture 54 is formed on the discharge part 3a of the main discharge electrode 3. This mixture 54 comprises an insulator and a conductor. The same substance as the abovementioned insulator 51 may be cited as an example of the insulator. It is desirable that the conductor be the same type of substance as the matrix material; however, a different type of substance may also be used. If an insulator or conductor that has a higher halogen resistance and a higher hardness than the metal of the main discharge electrode 3 is used, then the mixture 54 will have a higher halogen resistance and higher hardness than the metal of the main discharge electrode 3. If an insulator or conductor that has a higher halogen resistance and a higher melting point than the metal of the main discharge electrode 3 is used, then the mixture 54 will have a higher halogen resistance and higher melting point than the metal of the main discharge electrode 3.

Figure 6:
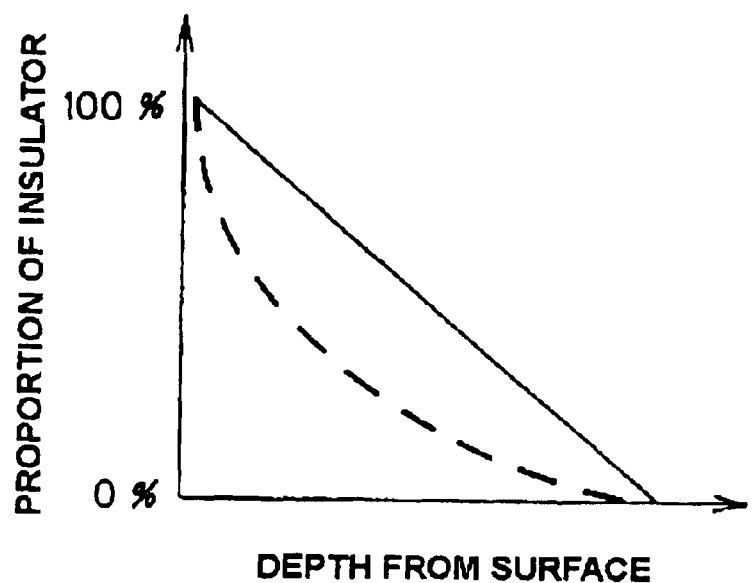
FIG. 6 is a graph which shows the relationship between the depth from the surface of the mixture 54 and the proportion of insulator contained in the mixture 54.

The mixture 54 is formed on the discharge part 3*a* by a flame coating method, a plasma flame coating method, an explosive flame coating method, a sputtering method, a metal vacuum evaporation method or the like. The mixture ratio of the insulator and conductor is regulated during the formation process so that the proportion of the conductor increases toward the side of the discharge part 3*a*, and so that the proportion of the conductor increases toward the side of the surface of the mixture 54. In this case, the process may be regulated so that the amount of insulator decreases in direct proportion to the depth from the surface of the mixture 54, as indicated by the solid line in FIG. 6, or so that this amount decreases according to a higher-order function or exponential function.

Furthermore, in the fourth embodiment, it would also be possible to form the film 5 of the abovementioned mixture by mixing an insulator with the discharge part 3*a* itself, so that the discharge part 3*a* itself is modified.

Figure 7:
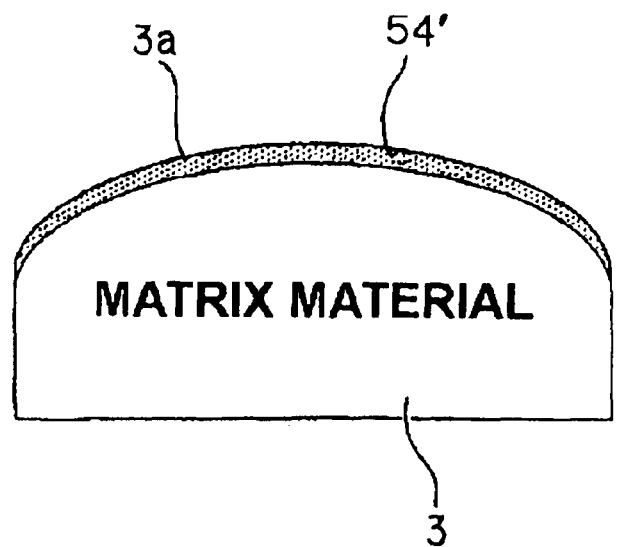
FIG. 7 is a sectional view of the main discharge electrode 3 as seen from the longitudinal direction.

FIG. 7 shows a sectional view of the main discharge electrode 3 as seen from the longitudinal direction. The mixture 54' is a film which is formed by mixing an insulator with the discharge part 3*a* of the main discharge electrode 3.

One method that can be used form the film 5 comprised of this mixture 54' is the ion injection method by ion plating. In the case of such an ion injection method by ion plating, a high voltage is applied between a positively ionized gas-form insulator and the negatively charged main discharge electrode 3, so that the ionized insulator is mixed with the discharge part 3*a*. In this case, the mixture ratio of the conductor and insulator in the discharge part 3*a* can be regulated by regulating the quantity of ions.

Furthermore, it would also be possible to form the mixture 54' by subjecting the discharge part 3*a* to a passivation treatment. For example, in the case of a main discharge electrode used in a gas laser apparatus in which a fluorine type laser gas is used, the discharge part 3*a* is subjected to a fluorination passivation treatment. When the discharge part 3*a* of the main discharge electrode 3 is heat-treated in a fluorine atmosphere, fluorine enters the discharge part 3*a*. As a result, the discharge part 3*a* becomes passive. To cite a more concrete example, copper fluoride is formed on the surface of a copper electrode when this copper electrode is subjected to a passivation treatment in a fluorine atmosphere.

Furthermore, the mixture 54' can also be formed by commonly used methods for creating alloys, methods for impregnating matrix materials with an insulator, and doping methods or the like.

In the fourth embodiment, a main discharge is performed between the main discharge electrodes 2 and 3 in which the abovementioned mixture 54 or 54' is formed on the discharge parts 2*a* and 3*a*. In this case, since the erosion by the halogen gas and the bombardment and heat that accompany the main discharge are absorbed by the mixture 54 or 54', there is no effect on the discharge parts 2*a* and 3*a*. Accordingly, deterioration of the main discharge electrodes 2 and 3 is inhibited, so that a stable laser output can be obtained.

Furthermore, the proportion of the conductor in the mixture 54 increases as the discharge part 3*a* is approached. Accordingly, the mixture 54 and the discharge part 3*a* show a good electrical affinity at the interface. Consequently, the possibility of the mixture 54 being stripped from the discharge part 3*a* all at one time is reduced.

Next, a case in which the film 5 is formed by a conductor will be described as a fifth embodiment.

The material of the main discharge electrode 3 and the thickness of the conductor are the same as in a case in which the insulator 51 shown in FIG. 2 is formed on the discharge part 3*a* of the main discharge electrode 3. Accordingly, individual descriptions will be omitted.

It is necessary that the conductor be a substance that possesses halogen resistance, and that this conductor be a substance that has a higher hardness than the metal of the main discharge electrode 3 or a substance that has a higher melting point than the metal of the main discharge electrode 3. Accordingly, the conductor that forms the film 5 is selected in accordance with the hardness and melting point of the main discharge electrode 3.

The conductor is formed on the discharge part 3*a* by a flame coating method, a plasma flame coating method, an explosive flame coating method, a sputtering method, a metal vacuum evaporation method or the like.

Furthermore, in the fifth embodiment, it would also be possible to form the discharge part 3*a* as an alloy by mixing a metal other than the metal of the main discharge electrode 3 with the discharge part 3*a* itself.

Figure 8A:
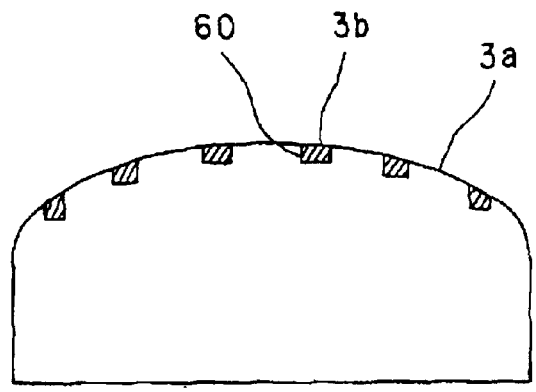
FIGS. 8A through 8C are diagrams that are used to illustrate the process whereby the discharge part 3a is converted into an alloy.
Figure 8B:
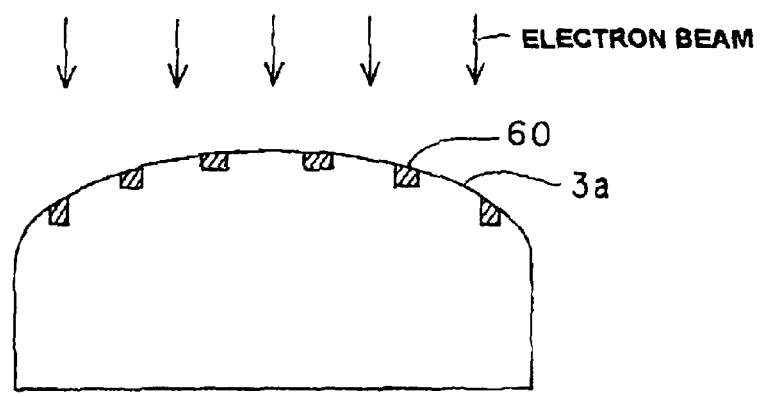
Figure 8C:
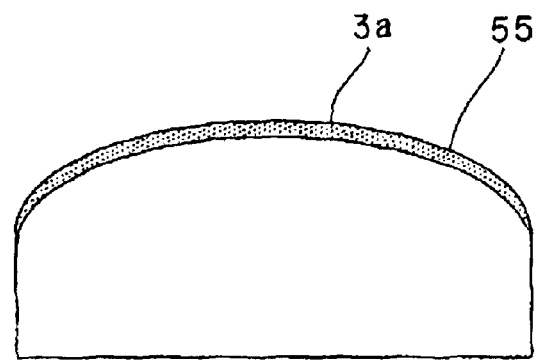

FIGS. 8A through 8C are diagrams that are used to illustrate the process whereby the discharge part 3*a* is formed into an alloy.

As is shown in FIG. 8A, holes 3*b* with a depth of 0.005 mm to 1.5 mm are formed in the discharge part 3*a* of the main discharge electrode 3. A metal 60 of a different type than the metal of the main discharge electrode 3 is rubbed into each hole 3*b*.

Next, the discharge part 3*a* and metal 60 are heated. In this case, if the main discharge electrode 3 as a whole is heated, the metal 60 melts and flows into the deep layer portions, so that the film becomes thicker. This is undesirable. In the present embodiment, as is shown in FIG. 8B, an electron beam is used in order to form a film of the desired thickness. Since this electron beam allows local heating, the thickness of the film can be regulated. When the discharge part 3*a* and metal 60 are irradiated with an electron beam, the metal of the discharge part 3*a* and the metal 60 melt and mix together. Then, when the discharge part 3*a* is cooled, the discharge part 3*a* forms an alloy 55 as shown in FIG. 8C. This alloy 55 is a conductor. For example, in a case where the main discharge electrode 3 is made of copper and the metal 60 is zinc, the alloy 55 is brass.

Furthermore, it would also be possible to place the metal 60 on the discharge part 3*a* and irradiate the metal with an electron beam instead of forming holes in the discharge part 3*a* and rubbing the metal 60 into these holes.

In the fifth embodiment, a main discharge is performed between the main discharge electrodes 2 and 3 in which the abovementioned conductor is formed on the discharge parts 2*a* and 3*a*. In this case, since the erosion by the halogen gas and the bombardment and heat that accompany the main discharge are absorbed by the conductor, there is no effect on the discharge parts 2*a* and 3*a*. Accordingly, deterioration of the main discharge electrodes 2 and 3 is inhibited, so that a stable laser output can be obtained.

Furthermore, since the film 5 is a conductor, the resistance between the main discharge electrodes 2 and 3 is even lower than in the second, third and fourth embodiment. Accordingly, the laser output is further increased.

Furthermore, in the first through fifth embodiments, a case was described in which a film 5 was formed on the main discharge electrodes 2 and 3, i.e., on the anode and cathode discharge parts 2a and 3a. However, in the case of the main discharge that is performed between the main discharge electrodes 2 and 3, consumption is severe in the main discharge electrode 3, i.e., in the anode. Accordingly, it would also be possible to form the abovementioned film 5 only on the main discharge electrode 3, i.e., only on the anode.

When a pulse discharge is repeatedly performed using electrodes such as those described in the first through fifth embodiments, there may be cases in which the film itself reacts with fluorine and is thus modified into another substance from the original substance. However, this does not present a problem as long as the film itself following this modification inhibits the shrinkage of the electrodes. Accordingly, in a sixth embodiment of the present invention, a protective film that is modified following repeated pulse discharges will be considered.

Before this sixth embodiment is described, the relationship between the abovementioned fluorine compound and the films of the first through fifth embodiments will be discussed.

In cases where a metal is exposed to a fluorine atmosphere so that a metal fluoride (in concrete terms, copper fluoride or the like) is formed, it is necessary the depth to which the fluorine invades the metal from the surface of the metal be large. One factor that promotes this invasion by fluorine is the surface temperature of the metal constituting the matrix material. This is not limited to electrodes, but may be the of metals in general.

In the case of laser electrodes, conditions are such that the discharge parts are elevated to a high temperature by the discharge, so that a thick fluoride film is formed. As a result, a fluorine compound is formed on the discharge parts as shown in FIG. 12.

It has been confirmed that electrode shrinkage is inhibited in the case of discharge parts on which a fluorine compound is formed. It appears that the effect in this case is as follows:

As was described above, it appears that electrode shrinkage is the gradual removed of the surface of the discharge part by sputtering. The fluorine compound that is formed on the discharge part of a copper electrode is copper fluoride. Since copper fluoride has a higher melting point and higher hardness than the copper that constitutes the electrode matrix material, this substance tends not to be removed by sputtering. Furthermore, copper fluoride is an insulator. Accordingly, the temperature rises as a result of the entry and exit of electrons, and the area where sputtering occurs in the interface between the copper fluoride and the electrode matrix material. Furthermore, at this interface, the electrode matrix material is eroded by the fluorine that passes through the copper fluoride. The fluorinated portion of the electrode matrix material forms a metal fluoride film that adheres firmly to the matrix material without being stripped from the matrix material. This metal fluoride film protects the matrix material from the discharge.

The rate of fluorine erosion of the matrix material of the electrode becomes slower as a result of the growth of the metal fluoride film. Then, after a certain fixed period of time, the erosion rate becomes almost zero, or becomes saturated at a low rate. As a result, sputtering of the electrode matrix material is inhibited, and severe erosion of the electrode matrix material by the fluorine is alleviated.

Generally, between a metal and a fluoride, the metal has a larger specific gravity. Accordingly, even in cases where there is a slight loss of the matrix material in the electrode, the amount of matrix material that is lost is compensated for by the amount of swelling of the fluoride; consequently, it may be the that the change in the volume of the electrode as a whole is small. Accordingly, there is little change in the distance between the main discharge electrodes, so that an effect that maintains the stability of the discharge is obtained.

However, the following problems 1 through 3 are encountered in the case of such a fluorine compound formed on the discharge part of an electrode.

Problem 1

Since the fluorine compound is an insulator, this compound produces an electrical resistance when a discharge occurs between the main discharge electrodes. This electrical resistance increases with an increase in the thickness of the copper fluoride film. If the film thickness is too large, the discharge loss is increased, so that the output efficiency with respect to the input electrical energy drops. However, if the film thickness is appropriate, there is no discharge loss, and no drop in the output efficiency is seen.

In order to obtain the desired output during laser operation, and in order to compensate for the drop in the output efficiency caused by the copper fluoride that increases in proportion to the number of laser shots, the system is regulated so that the input electrical energy (voltage) or laser gas pressure gradually increases. However, at the point in time at which the desired laser output cannot be obtained even if the input electrical energy or laser gas pressure is regulated, it is judged that the useful life of the electrodes has been reached, and maintenance of the laser apparatus is necessary.

Generally, since the fluorine compound (copper fluoride in this case) is an insulator, this compound does not possess electrical conductivity. In particular, if an insulator is present on the discharge part, the current is subjected to resistance. In such cases, since the current cannot flow through the insulator, the current tends to flow as indicated by the arrow A in FIG. 25A. Specifically, when the current reaches the outermost surface of the electrode from the side of the opposite electrode, the current first advances along the surface of the insulator 251 that is present on the outermost surface of the electrode, and flows toward the boundary between the conductor 250 and the insulator 251. As a result, the impedance of the discharge is large, leading to non-uniformity of the discharge.

Figure 25A:
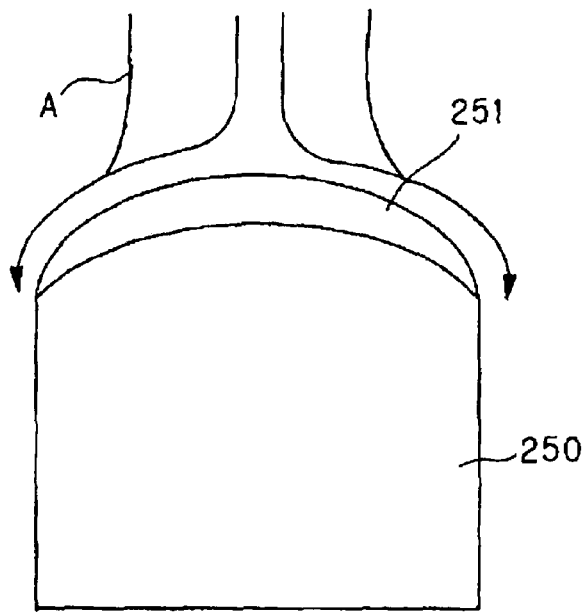
FIGS. 25A and 25B are diagrams that show the surface skin effect.
Figure 25B:
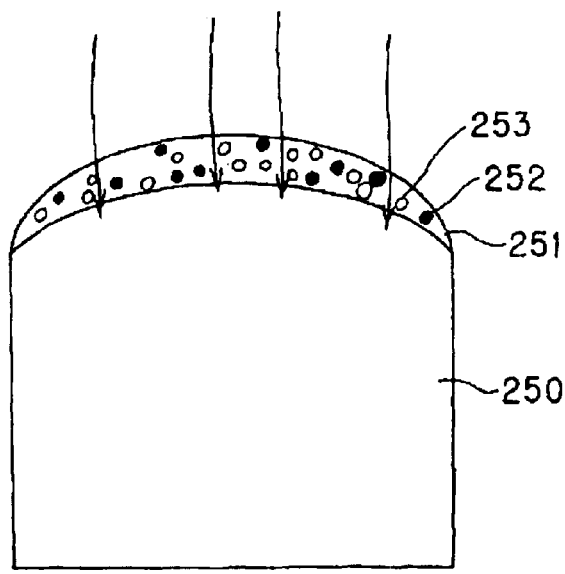

In some cases, however, such a phenomenon does not occur even if an insulator such as a fluorine compound or the like is present on the outermost surface of the electrode. This refers to cases in which a conductor 252 such as a metal or the like is present in the film of the insulator 251, or in which voids 253 are present in this film, as shown in FIG. 25B. The electrical resistance of the film of this insulator 250 is not that great with respect to a pulsed power discharge current. The reason for this can be explained in terms of the surface skin effect of a pulsed power current, which will be described next.

A pulsed power current, especially the pulsed power current used in an excimer laser, is applied for an extremely short period of time (a few hundred nanoseconds). Accordingly, while the current used in an excimer laser is a direct current, this current also has properties of an alternating current. Because of the surface skin effect, such a pulsed power current cannot enter deeply into a conductor. For example, in the case of the pulsed power current used in an excimer laser, the current oscillation width is approximately a hundred nanoseconds; converted into the frequency of an alternating current, this corresponds to a high frequency of approximately 10 MHz. When this current flows through the surface of a conductor, the depth to which the current can invade the conductor is several tens of microns to several hundred microns. Accordingly, it may be that unlike the resistance in the case of a completely direct-current discharge, the resistance with respect to such a pulsed power current is not determined by the electrical conductivity of the material, but is rather determined by the size of the surface of the substance.

When voids 253, an insulator 251 and a conductor 252 are present inside the film as shown in FIG. 25B, the surfaces of the voids 253 and the boundary surfaces between the insulator 251 and the conductor 252 form a path for the passage of the pulsed power discharge. Accordingly, as is indicated by the arrow A in FIG. 25A, the pulsed power discharge current can flow through the insulator 251 in apparent terms and reach the conductor 250 without flowing around through the surface of the insulator 251. Accordingly, there is no increase in the impedance of the discharge as shown in FIG. 25A, so that the phenomenon of non-uniformity of the discharge is avoided.

Problem 2

During the discharge, heat is generate in the discharge parts of the electrodes as a result of the entry and exit of electrons; in particular, the anode side reaches a high temperature. Accordingly, if the flow of electrons varies as a result of differences in the discharge conditions, a difference also occurs in the temperature of the discharge parts of the electrodes. For example, the discharge may be an arc discharge or a glow discharge. In the case of an arc discharge, the electrons move between the electrodes as a mass, while in the case of a glow discharge, the electrons move between the electrodes in a dispersed state. When the electrons move as a mass and reach the electrode on the anode side, the rise of the voltage in the electrode discharge part is conspicuous; as a result, the quantity of heat (loss) occurring in the electrode discharge part increases. This may be explained by the relationship of V=IR (I is proportional to the electron density, and R is fixed).

Furthermore, the laser pulse power supply that supplies the input electrical energy is electrically connected to the electrodes. An electrical resistance distribution in the longitudinal direction appears in the electrodes depending on the manner in which the electrodes are mechanically held inside the chamber.

Furthermore, the laser gas undergoes forced convection so that this laser gas cuts laterally across the space between the main discharge electrodes in a direction perpendicular to the longitudinal direction of the electrodes. The cooling efficiency of the electrode surfaces arising from the convention current of the laser gas is higher in the center of the electrodes (with respect to the longitudinal direction of the electrodes) than at both ends of the electrodes.

It appears from the above that a temperature distribution in the longitudinal direction of the electrodes is induced by the current distribution arising from variations in the electrical resistance corresponding to variations in the electrode holding structure such as the positions of bolts or the like, and by variations in the cooling efficiency based on the convection current of the laser gas, so that a fluorine compound that is non-uniform in the longitudinal direction of the electrodes is formed.

Furthermore, variations in the discharge conditions caused by a non-uniform fluorine compound lead to further non-uniformity. For example, it has been confirmed by experiment that the fluorine compound is easily formed at both ends with respect to the longitudinal direction of the electrodes, and is formed only with difficulty in the centers of the electrodes. Furthermore, completely independently of this, it has also been confirmed that sites in which the fluorine compound is easily formed are present in an irregular distribution. However, as was described above, it appears that the main cause of such sites is the temperature distribution in the longitudinal direction of the electrodes. The causes of such a temperature distribution are conjectural.

Furthermore, in the case of electrodes on which a fluorine compound that is non-uniform in the longitudinal direction of the electrodes is formed, the discharge conditions are unstable inside the laser resonator, so that the stability of the individual laser pulses is sacrificed. In regard to this stability, an arbitrary threshold value is determined, and at the point in time at which the non-uniformity of the fluorine compound progresses so that the stability deteriorates to this threshold value, it is judged that the useful life of the electrodes has ended in the same manner as in the case of problem 1.

Figure 26:
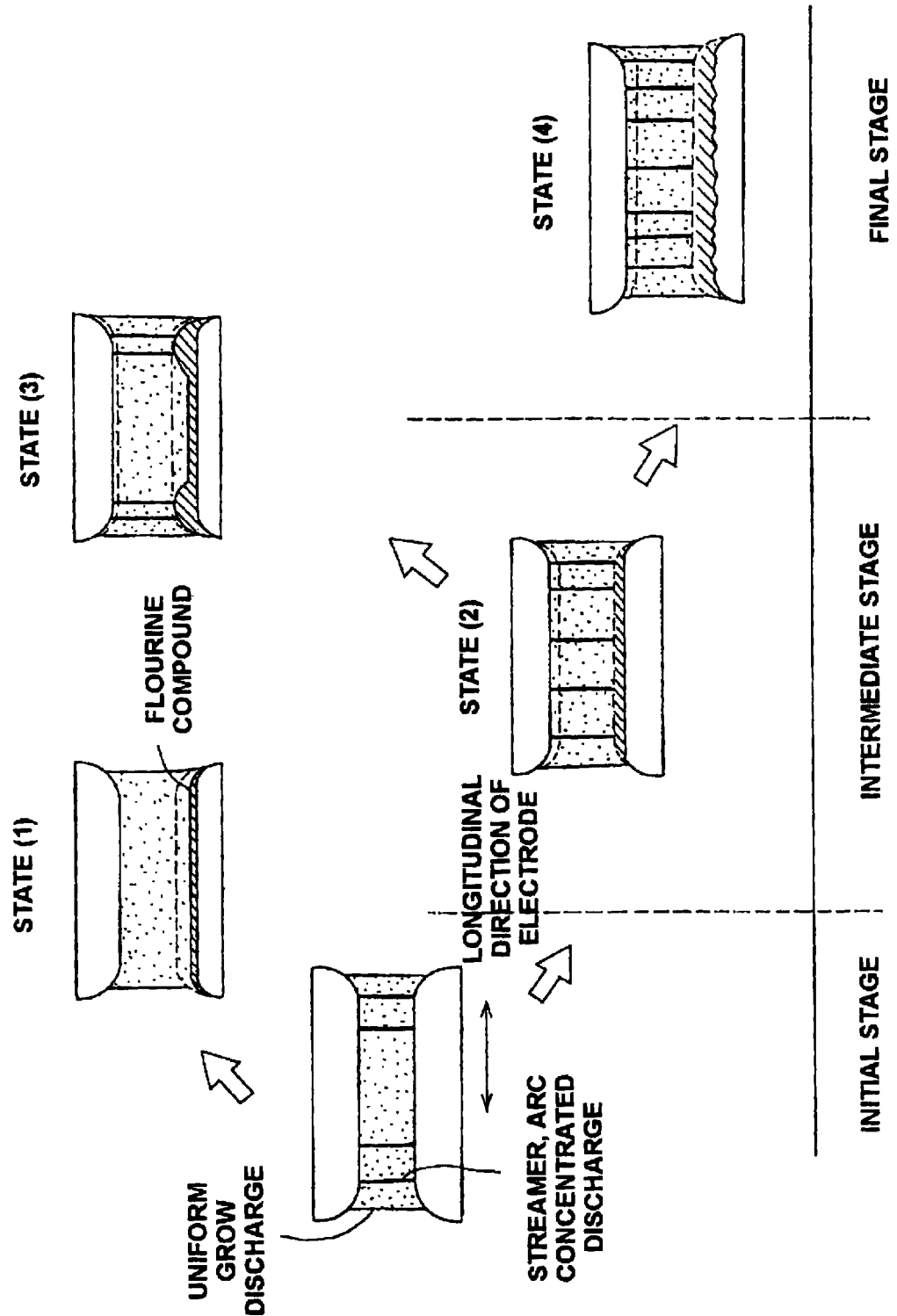
FIG. 26 is a diagram that shows the change in the electrodes in accordance with laser operation.
Figure 27A:
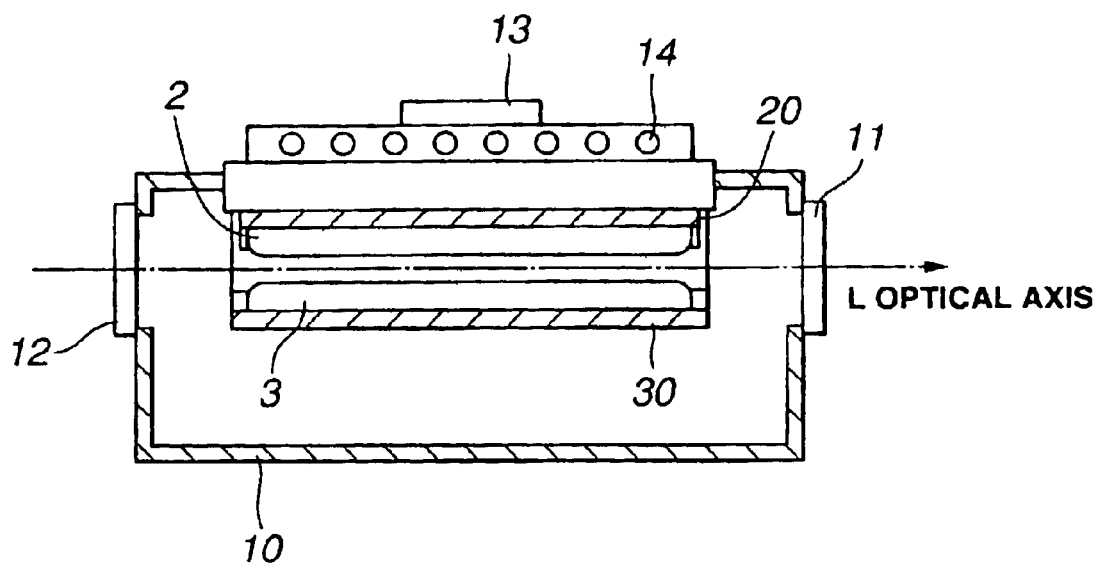
FIGS. 27A and 27B are diagrams that show the prior art.
Figure 27B:
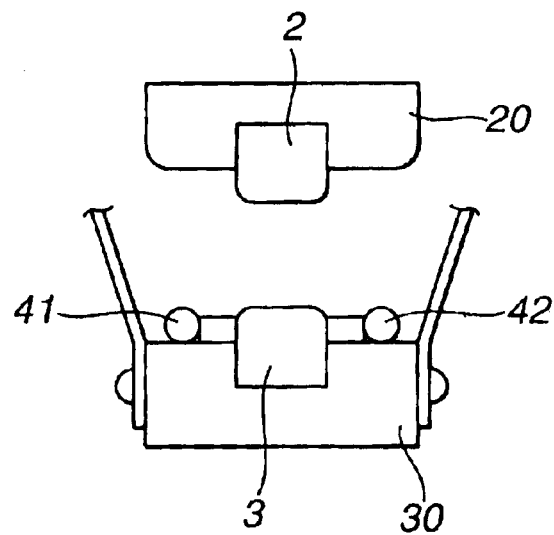

Here, the process of fluorine compound formation during conventional excimer laser operation will be described with reference to FIG. 26.

First, in the initial-stage process, the electrode discharge parts are eroded by a discharge in a halogen gas atmosphere. Here, two different phenomena are induced: namely, a consumption process caused by halogen erosion, sputtering and the like in the electrode discharge parts, and a process of halogenation of the electrodes, i.e., swelling or protection of the matrix material caused by the conversion into an insulator.

During the period extending from the initial-stage process into the intermediate-stage process, the state of the electrodes can be divided into two states. If the extent of the consumption process caused by halogen erosion, sputtering and the like is greater than the extent of the swelling or matrix material protection process caused by conversion into an insulator, the electrodes will be consumed. In such a case, the consumption of the electrodes proceeds more quickly than the design value, so that the results indicated in state (1) are obtained. In the case of state (1), a fluorine compound with a thickness of several tens of microns is formed on the electrode on the anode side, but the consumption rate of the electrode is rapid. The consumption of the electrode proceeds uniformly in the longitudinal direction of the electrode, and there is a progressive increase in the distance between the main discharge electrodes and the destruction of the shape of the electrode discharge parts, so that it becomes impossible to maintain the desired laser performance. Accordingly, in the case of state (1), the useful life of the electrodes does not reach the design useful life.

On the other hand, if the extent of the swelling or matrix material protection process caused by conversion into an insulator is greater than the extent of the consumption process caused by halogen erosion, sputtering and the like during the period extending from the initial-stage process to the intermediate-stage process, then the electrodes can withstand the process up to the intermediate process as shown in state (2). In the case of state (2), a fluorine compound with a thickness of several tens of microns is formed on the electrode on the anode side. There are slight differences in the film thickness; in some areas, a thick fluorine compound with a thickness of approximately 50 $\mu$m is formed.

During the period extending from the intermediate-stage process to the final-stage process, there is generally a tendency for a fluorine compound to be easily formed in the vicinity of both ends of the electrodes with respect to the longitudinal direction of the electrodes, while in the vicinity of the centers of the electrodes with respect to the longitudinal direction of the electrodes, there is a tendency for such a fluorine compound to be formed only with difficulty. Accordingly, a fluorine compound is formed which has a different film thickness in the centers of the electrodes and both ends of the electrodes with respect to the longitudinal direction of the electrodes. If the difference in the film thickness of this fluorine compound is extremely large, then the distance between the main discharge electrodes will be non-uniform between the vicinity of the centers of the electrodes and the vicinity of both ends of the electrodes with respect to the longitudinal direction of the electrodes. In the case of such an electrode state, the discharge is concentrated in the end portions of the electrodes. This result is shown in state (3). In the case of state (3), a thick fluorine compound with a thickness of approximately 100 $\mu$m is formed in the vicinity of both ends of the electrode on the anode side, and a fluorine compound with a thickness of several tens of microns is formed in the vicinity of the center of this electrode. As a result, the laser oscillation efficiency drops, so that the desired laser performance cannot be maintained, with variation occurring in the output energy. Accordingly, in the case of state (3), the useful life of the electrodes does not reach the design useful life.

In electrodes that do not show a state such as state (30, a fluorine compound is formed with a certain degree of uniformity in the longitudinal direction of the electrodes. This result is shown in state (4). In the case of state (4) a thick fluorine compound with a thickness of approximately 100 $\mu$m is formed uniformly in the longitudinal direction of the electrodes. The degree of uniformity determines whether or not the desired laser performance can be obtained. Accordingly, even if there is some degree of non-uniformity, i.e., even if the film appears to be non-uniform, it is sufficient if the desired laser performance can be maintained.

Problem 3

As has already been explained, a fluorine compound can easily be formed if the fluorine concentration in the laser gas is increased, but it is difficult to adjust the fluorine concentration to a high value. This is based on the following line of reasoning.

There is strong correlation between the fluorine compound and the fluorine concentration in the laser gas inside the laser chamber. In cases where the fluorine concentration is high, a fluorine compound is easily formed, while in cases where the fluorine concentration is low, almost no fluorine compound is formed. It appears from this that the rate of the reaction between the electrode matrix material and the fluorine depends not only on the temperature of the electrode matrix material, but also on the fluorine concentration in the laser gas.

The fluorine compound is formed by the gradual progression of a reaction between the electrode matrix material and the fluorine in the laser gas, and this compound is always present on the electrode surface. However, in cases where the fluorine concentration is low, the rate of the reaction between the electrode matrix material and the fluorine is slow, so that the fluorine compound is blown away by the melting and evaporation of the electrode matrix material that occurs simultaneously in the same reaction site. Thus, formation and loss of the fluorine compound are repeated, and the electrode matrix material shrinks during this period. On the other hand, in cases where the fluorine concentration is high, the reaction rate between the electrode matrix material and the fluorine is rapid, so that the process is governed by the formation of the fluorine compound rather than the blowing away of the fluorine compound, and the film thickness of the fluorine compound gradually increases.

In spite of the fact that this fluorine compound is a breakthrough discovery for inhibiting shrinkage of the electrode discharge parts, the abovementioned problems 1 through 3 remain. Using the discovery of this fluorine compound as an opportunity, an ideal electrode structure for greatly extending the useful life of the electrodes by inhibiting shrinkage of the electrode discharge parts was investigated. According to this investigation, the following (a) through (e) are sufficient conditions for this electrode structure.

(a) The input electrical energy of the laser apparatus is efficiently transmitted to the discharge space, so that the laser output efficiency is comparable to or greater than that obtained in a case where electrodes with a conventional structure are used. Accordingly, for example, the protective film formed on the electrode discharge parts does not lower the electrical resistance between the main discharge electrodes.

(b) The loss of material caused by sputtering on the surface of the electrode matrix material that occurs during the discharge is inhibited. Accordingly, the protective film that is formed on the electrode discharge parts has a hardness and melting point that are sufficiently higher than those of the electrode matrix material, and also has a sufficient thickness and adhesive strength with the electrode matrix material, i.e., a film strength that is sufficient to withstand sputtering bombardment during the discharge.

(c) In order to maintain discharge stability within the laser resonator, the film material and film thickness of the protective film that is formed on the electrode discharge parts is uniform in the longitudinal direction of the electrodes. The reason for this is as follows: for example, if there is any variation in the film material or film thickness, the discharge conditions will vary in the longitudinal direction of the electrodes, so that an abnormally large arc discharge may occur in some places.

(d) The electrode shape is such that the electron current during discharge is present in a desired dispersed state in the direction of width of the electrodes. For example, if the current is concentrated in the central portions with respect to the direction of width of the electrodes, the sputtering effect is increased only in the central portions of the electrodes, so that there is a change in the electrode shape. As a result, there is a change in the laser profile.

(e) The abovementioned characteristics must be maintained until the desired electrode replacement interval has elapsed.

From the consideration of (a) through (e) above, concrete examples of effective electrode structures may be classified into categories (1) through (3) below.

(1) The first electrode structure is an electrode structure in which the problems encountered in forming a conventional fluorine compound are solved, and a fluorine compound is formed in accordance with the laser operation. Specifically, this is an electrode structure in which a fluorine compound that is uniform in the longitudinal direction of the electrodes and that has a desired film thickness is formed after a specified number of laser shots.

In order to realize such an electrode structure, e.g., in order to make the heat distribution in the longitudinal direction of the electrodes uniform, a laser chamber is required in which the shape of the electrodes, the shape of the protective film, the material distribution, the method by which the electrodes are held, the gas flow inside the chamber and the like are appropriately set. In this case, however, depending on the type of laser apparatus involved, there may be instances in which the $F_2$ concentration cannot be set at the required parameter. Accordingly, a method is conceivable in which the interior of the laser chamber is filled with a gas that has a high $F_2$ concentration prior to the mounting of the product apparatus, and a desired fluorine compound is formed on the electrode discharge parts by performing a discharge for a specified number of laser shots.

(2) The second electrode structure is an electrode structure in which a protective film that has a function comparable to that of the abovementioned fluorine compound is formed on the electrode discharge parts in the initial stage of laser operation, and this film is gradually modified into a conventional fluorine compound with each laser shot, in order to solve the problems encountered in the formation of a conventional fluorine compound.

The object of this protective film is to form a strong metal fluoride film on the surface of the matrix material with good reproducibility. It is desirable that the material of the protective film be present on the electrode discharge parts until the useful life of the electrodes is ended. In actuality, however, the material of the protective film disappears from the electrode discharge parts after a fixed number of laser shots, so that the electrode discharge parts are more or less modified into a fluorine compound.

(3) The third electrode structure is an electrode structure which has a protective film instead of a fluorine compound from the initial stage of laser operation, and which shows no modification until the end of the useful life of the electrodes.

Here, the electrode structure of (2) (among the electrode structures of (1) through (3)) will be described as a sixth embodiment of the present invention.

Figure 13A:
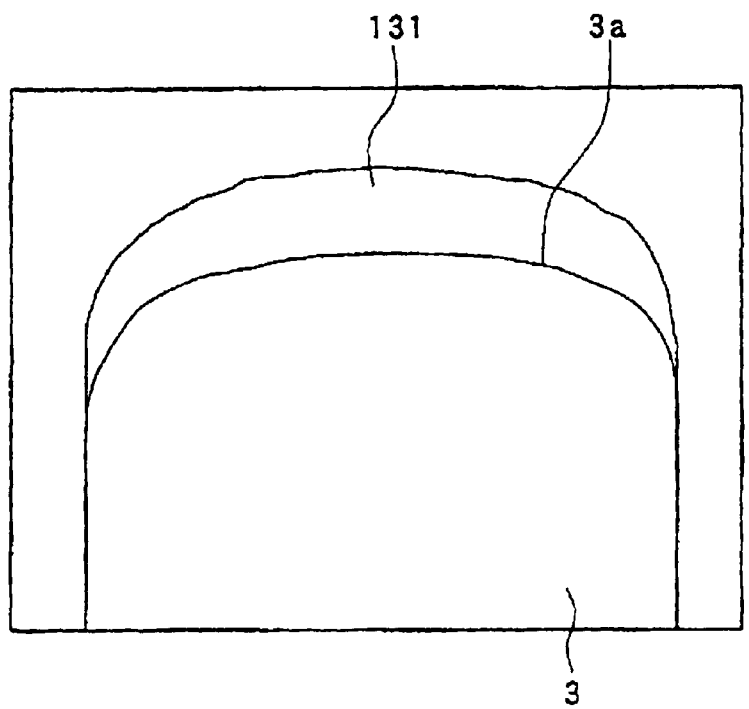
FIGS. 13A and 13B are sectional views of the main discharge electrode 3 before and after repeated pulse discharges, as seen from the longitudinal direction.
Figure 13B:
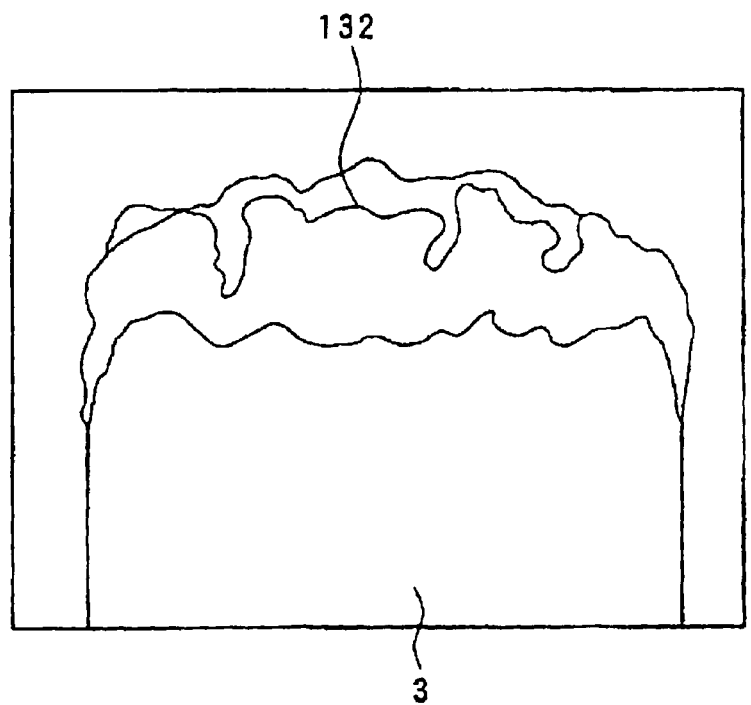

FIGS. 13A and 13B are sectional views of the main discharge electrode 3 before and after repeated pulse discharges, as seen from the longitudinal direction.

As is shown in FIG. 13A, alumina and copper are alternately laminated so that a film 131 with an overall thickness of 0.3 mm is formed on the surface of the discharge part of the main discharge electrode 3 as the initial state. The weight ratio of alumina to copper is 4:6. As a result of a desired number of repeated pulse discharges being performed, the shrinkage of the discharge part 3a is inhibited, and a film 132 resembling a fluorine compound is formed on the discharge part 3a as a result of modification of the protective film. This film 132 is a substance that is more or less close to copper fluoride, and contains some other elements. These other elements appear to be elements contained in the alumina itself. However, since the laser performance is equal to that obtained in a state in which a fluorine compound is formed, it appears that there is no deterioration in the laser performance due to shrinkage of the discharge part 3a.

If the film 121 comprised of a fluorine compound and the film 132 resembling a fluorine compound are compared, the overall conditions are extremely similar; however, the two films differ in the following respects (i) through (iii):

(i) The main discharge electrode 3 in FIG. 13B shows no change in the height itself due to shrinkage of the discharge part 3a.

(ii) The film 132 more or less maintains the curvature of the initially formed film 131. Accordingly, the drop in the output energy and deterioration in the laser performance can also be kept to an extent that is comparable to or better than the values seen in cases where the film 121 is formed.

(iii) The film 132 is homogeneous overall. If the material is homogeneous in addition to extreme indentations and projections, the concentration of the discharge in the central portions of the discharge parts can be avoided, so that a uniform discharge can be stably generated.

As in the case of the film 121 comprised of a fluorine compound, the principle of formation of the film 132 resembling a fluorine compound shown in FIGS. 13A and 13B is unclear; however, it is thought that this principle is as follows: initially, alumina and copper are alternately laminated on the electrode in the discharge part 3a. When repeated pulse discharges are performed, the copper in the layer closest to the laser gas atmosphere (among the respective layers) is eroded by the fluorine in the laser gas, so that this copper is modified into copper fluoride, and the alumina is also modified. As a result, it is thought that the film as a whole is fluorinated so that this film is modified into a film 132 that resembles a fluorine compound. Furthermore, as is shown in FIGS. 13A and 13B, the copper of the matrix material itself is also modified by fluorination, so that the initial curvature of the contact surfaces of the copper of the matrix material and the initial film 131 is not maintained. However, the initial shape of the surface of the initial film 131 is more or less maintained. Since the exit of the lines of magnetic force along which the arc column is formed at the time of the discharge is the surface of the film, the fact that the shape of the film surface is maintained is advantageous from the standpoint of the uniformity of the arc column.

Here, the initial thicknesses of the respective layers will be considered. In order to prolong the electrode replacement interval, it is desirable that the film itself be thick. However, if the film is considered in terms of a capacitor, then it may be the that the (alternating current) electrical resistance between the main discharge electrodes is increased by increasing the thickness of the film. Accordingly, an upper limit is set on the thickness of the film. In particular, a film in which an insulator and a conductor are alternately laminated may be viewed as a state in which capacitors with a small capacitance are connected in series. Compared to a film in which an insulator and a conductor are uniformly mixed, such a film in which an insulator and a conductor are alternately laminated can be made thicker in a case where the resistance is the same. Furthermore, the respective layers are successively eroded so that homogeneous layers are formed. Viewed in such terms, it appears that it is better if the respective layers have an extremely small thickness. Conversely, also viewed in these terms, it may be the that the thickness of the overall film depends on how small the thicknesses of the respective layers can be made.

Figure 14:
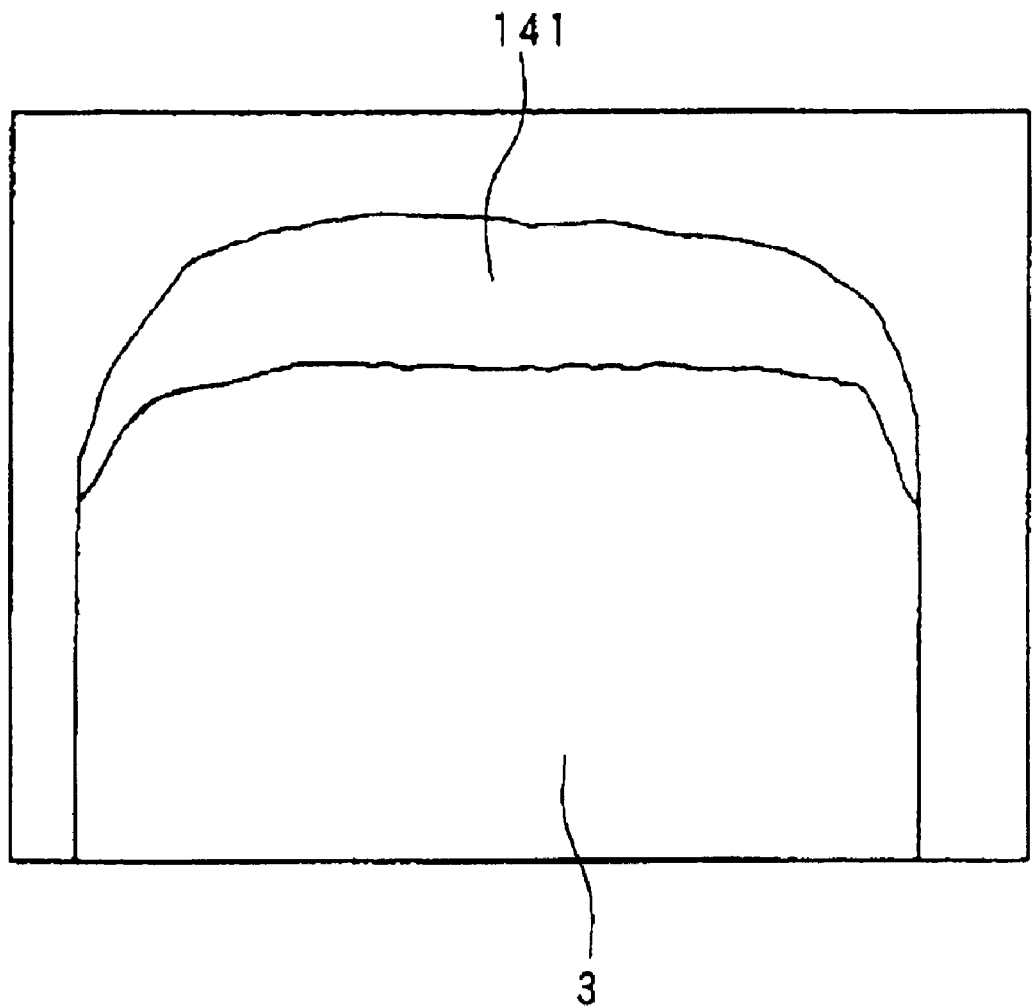
FIG. 14 is a sectional view of the main discharge electrode 3 following repeated pulse discharges, as seen from the longitudinal direction.
Figure 15A:
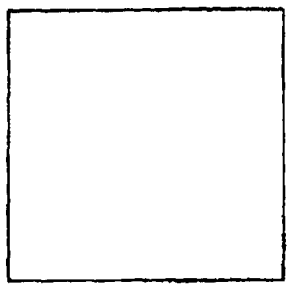
FIGS. 15A through 15F show types 1 through 6 of the layers inside the film.
Figure 15B:
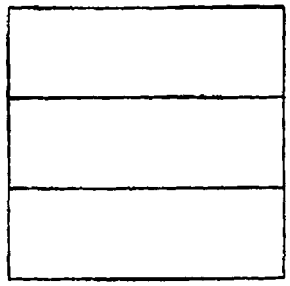
Figure 15C:
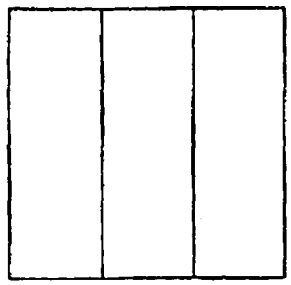
Figure 15D:
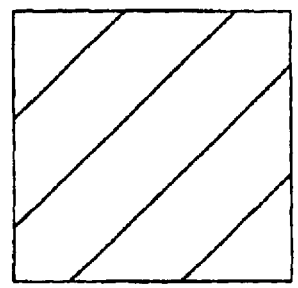
Figure 15E:
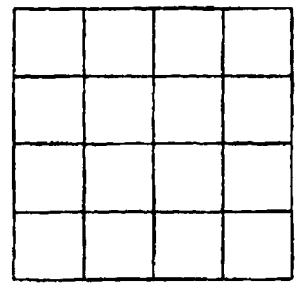
Figure 15F:
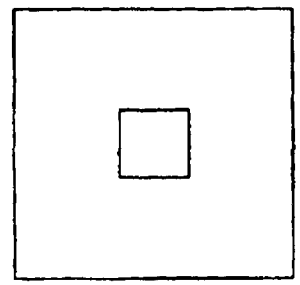
Figure 17E:
Figure 17F:
Figure 17G:
Figure 17H:
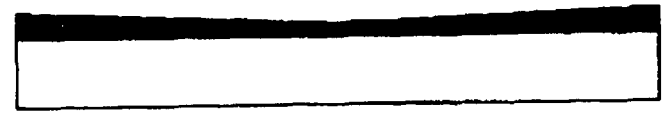

FIG. 14 is a sectional view of the main discharge electrode 3 following repeated pulse discharges as seen from the longitudinal direction.

Here, the initial state of the film 141 and the laser operating conditions are the same as in the experiment performed using the film 131 shown in FIGS. 13A and 13B. However, the weight ratio of alumina to copper is 1:1. As a result of repeated pulse discharges, the initial state of the film 141 is more or less maintained, as is shown in FIG. 14. According to the experience of the applicant, it appears that a ratio (weight ratio) of about 1:1 between the insulator and the conductor is the boundary between cases where the state of the initial film is maintained and cases where the initial film is modified. For example, in cases where the initial film is modified, it is desirable that the proportion of the insulator be approximately 40%.

Thus, even if the film formed on the discharge parts is modified into a film that resembles a fluorine compound, it is important that the function that inhibits shrinkage of the discharge parts be maintained. In cases where the ultimate aim is to form a film that resembles a fluorine compound, the initial film may be formed by devising the structure and materials so that modification occurs at a certain reaction rate.

For example, since the fluorine compound is formed by the reaction of fluorine and copper, impurities that promote this reaction may be uniformly injected or embedded in the main discharge electrodes. Furthermore, even if a layer form is not used, an insulator may be formed on the surface of the matrix material, and a conductor may be formed on top of this. Furthermore, it is not absolutely necessary that the width of the matrix material be equal to the width of the discharge parts. Chang type electrodes that have a larger curvature, and that discharge only in the central part of the electrode, may also be used. Furthermore, a plurality of different types of film materials may also be used.

Various types are conceivable in the structures and materials of the films described in the respective embodiments described above. These will be described below.

(1) Structure of the Film

In regard to the structure of the film, this structure may be divided into ((1)) types of the layers inside the film, ((2)) types of the distribution of the conductor and insulator, ((3)) types of the thickness of the film, and ((4)) types of partially formed films. These types will be described with reference to FIGS. 15 through 18. In the following descriptions, the longitudinal direction of the main discharge electrodes is referred to simply as "the longitudinal direction", and the direction of width of the main discharge electrodes is referred to simply as "the direction of width".

((1)) Concerning Types of the Layers Inside the Film

FIGS. 15A through 15F show types 1 through 6 of the layers inside the film. Types 1 through 6 of the layers are sectional views as seen from the longitudinal direction, or sectional views as seen from the direction of width. Layer type 1 shows a single layer. Layer type 2 shows a plurality of layers laminated in the direction perpendicular to the surface of the discharge part. Layer type 3 shows a plurality of layers laminated in the direction parallel to the surface of the discharge part. Layer type 4 shows a plurality of layers laminated in a direction other than the direction perpendicular to the surface of the discharge part or the direction parallel to the surface of the discharge part. Furthermore, in layer types 2 through 4, the number of layers and the thicknesses of the respective layers are arbitrary. Layer type 5 shows network-form or lattice-form layers. Layer type 6 shows a layer that partially includes another layer. The number and arrangement of such other layers are arbitrary.

((2)) Concerning Types of the Distribution of the Conductor and Insulator

FIGS. 16A through 16D show types 1 through 4 of the distribution of the conductor and insulator in a layer in which this conductor and insulator are mixed. Distribution types 1 through 4 are sectional views as seen from the longitudinal direction, or sectional views as seen from the direction of width. Distribution type 1 shows a distribution in which the mixture ratio of the conductor and insulator is uniform at all positions. Distribution type 2 shows a distribution in which the mixture ratio of the conductor is large at one end, and the mixture ratio of the insulator increases toward the other end. Distribution type 3 shows a distribution in which the mixture ratio of the conductor is large in the central portion, and the mixture ratio of the insulator increases toward both ends. Conversely, this may also be a distribution in which the mixture ratio of the insulator is large in the central portion, and the mixture ratio of the conductor increases toward both ends. Distribution type 4 shows a distribution in which the mixture ratio of the conductor is large in the central portion, and the mixture ratio of the insulator increases radially toward the outside. Conversely, this may also be a distribution in which the mixture ratio of the insulator is large in roughly the central portion, and the mixture ratio of the conductor increases radially toward the outside.

((3)) Concerning Types of the Thickness of the Film

FIGS. 17A through 17H show types 1 through 8 of the film thickness. Thickness types 1 through 4 are sectional views as seen from the longitudinal direction. Thickness types 5 through 8 are sectional views. Thickness type 1 shows a film in which the thickness in a sectional view seen from the direction of width is uniform. Thickness types 2 and 3 show films in which the central portion of the section is thick, and the film becomes thinner toward both ends. In thickness type 2, the degree of reduction in the thickness increases toward both ends. In thickness type 3, the degree of reduction in the thickness is constant at all positions. Thickness type 4 shows a film in which the central portion of the section is thin, and the film becomes thicker toward both ends. Thickness type 5 shows a film in which the thickness of the section is uniform. Thickness types 6 and 7 show films in which the central portion of the section is thick, and the film becomes thinner toward both ends. In thickness type 6, the degree of reduction in the thickness becomes greater toward both ends. In thickness type 7, the degree of reduction in the thickness is constant at all positions. Thickness type 8 shows a film in which the central portion of the section is thin, and the film becomes thicker toward both ends.

((4)) Concerning Types of Partially Formed Films

FIGS. 18A through 18F shows types 1 through 5 of partially formed films. Film types 1 through 5 are three-way views of main discharge electrodes as seen respectively from (i) the side of the opposite main discharge electrode, (ii) the direction of width, and (iii) the longitudinal direction. Film type 1 shows films arranged in a row as a plurality of points; each film is arranged so that it is parallel to the longitudinal direction. the shapes of the respective films may be hemispherical, columnar or the like. Furthermore, a plurality of rows may also be installed. Film type 2 shows a film in which a plurality of holes are arranged in a row. The respective holes are arranged so that these holes are parallel to the longitudinal direction. The shapes of the respective holes may be hemispherical, columnar or the like. Film types 3 and 4 show linear films; these films are formed so that the films are parallel to the longitudinal direction. The films may be positioned on the central portion as shown in type 3, or on both end portions as shown in type 4. For example, the cross-sectional shapes of the films as seen from the longitudinal direction may be semicircular, polygonal or the like. Furthermore, the number of films is arbitrary. Type 5 shows linear films; these films are formed so that they are perpendicular to the longitudinal direction. For example, the cross-sectional shape of the films as seen from the direction of width may be semicircular, polygonal or the like. Furthermore, the number of films is arbitrary.

In the present invention, films are formed by appropriately combining the various types indicated in ((1)) through ((4)) above. Some concrete examples are shown in FIGS. 19A and 19B and FIGS. 24A through 24F. Furthermore, in the following descriptions, (a) mixtures in which the conductor and/or insulator that are mixed are different will be envisioned as different mixtures, and (b) mixtures in which the conductor and insulator that are mixed are the same substances but the mixture ratios are different will also be envisioned as different mixtures. Furthermore, in regard to (b), mixtures in which the mixture ratio of the conductor or insulator is zero are also included, and mixtures in which the conductor or insulator is the same as the matrix material are also included.

Figure 19A:
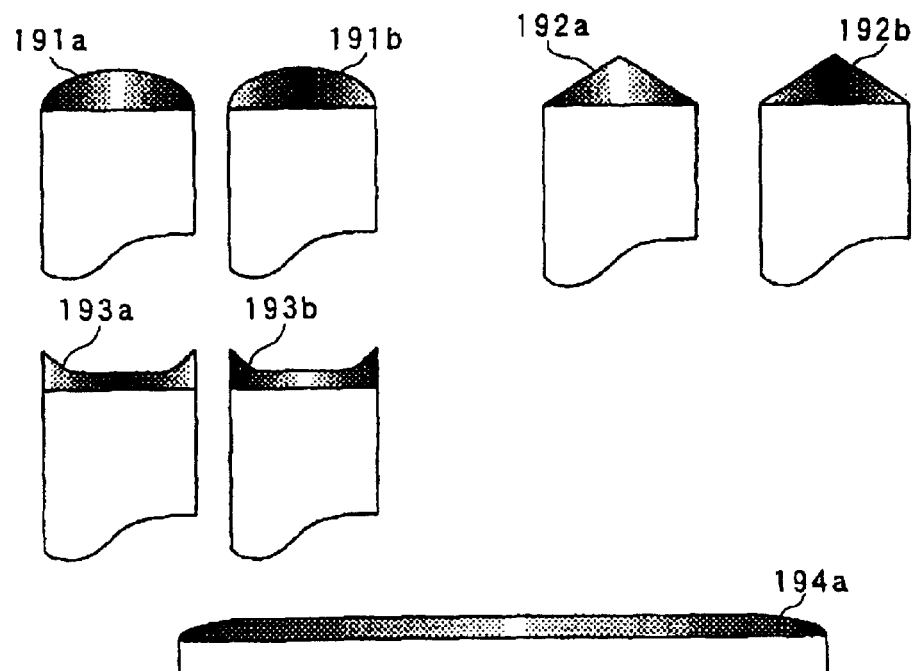
FIG. 19A is a sectional view of a plurality of main discharge electrodes as seen from the longitudinal direction.
Figure 19B:
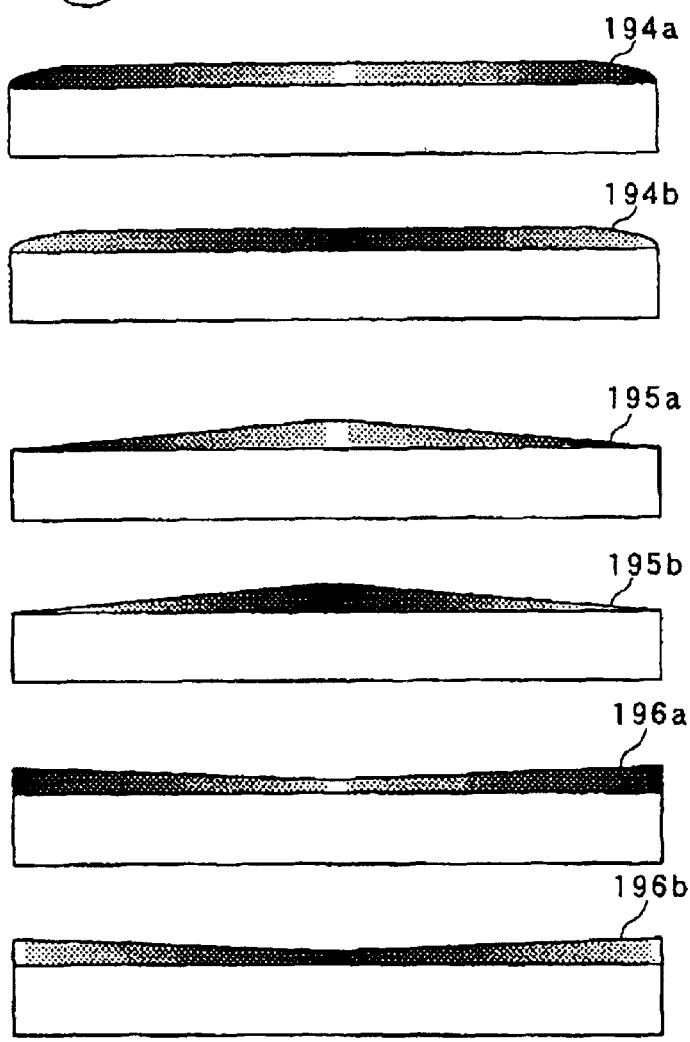
FIG. 19B is a sectional view of a plurality of main discharge electrodes as seen from the direction of width.

FIG. 19A shows sectional views of a plurality of main discharge electrodes as seen from the longitudinal direction, and FIG. 19B shows sectional views of a plurality of main discharge electrodes as seen from the direction of width.

The films 191a and 192a are formed so that the mixture ratio of the conductor is high and the film is thick in the central portion of the section, and so that the mixture ratio of the insulator becomes higher and the film becomes thinner toward both ends. The films 191b and 192b are formed so that so that the mixture ratio of the insulator is high and the film is thick in the central portion of the section, and so that the mixture ratio of the conductor becomes higher and the film becomes thinner toward both ends. The film 193a is formed so that the mixture ratio of the conductor is high and the film is thin in the central portion of the section, and so that the mixture ratio of the insulator becomes higher and the film becomes thicker toward both ends. The film 193b is formed so that the mixture ratio of the insulator is high and the film is thin in the central portion of the section, and so that the mixture ratio of the conductor becomes higher and the film becomes thicker toward both ends.

The films 194a and 195a are formed so that the mixture ratio of the conductor is high and the film is thick in the central portion of the section, and so that the mixture ratio of the insulator becomes higher and the film becomes thinner toward both ends. The films 194b and 195b are formed so that the mixture ratio of the insulator is high and the film is thick in the central portion of the section, and so that the mixture ratio of the conductor becomes higher and the film becomes thinner toward both ends. The film 196a is formed so that the mixture ratio of the conductor is high and the film is thin in the central portion of the section, and so that the mixture ratio of the insulator becomes higher and the film becomes thicker toward both ends. The film 196b is formed so that the mixture ratio of the insulator is high and the film is thin in the central portion of the section, and so that the mixture ratio of the conductor becomes higher and the film becomes thicker toward both ends.

Figure 20:
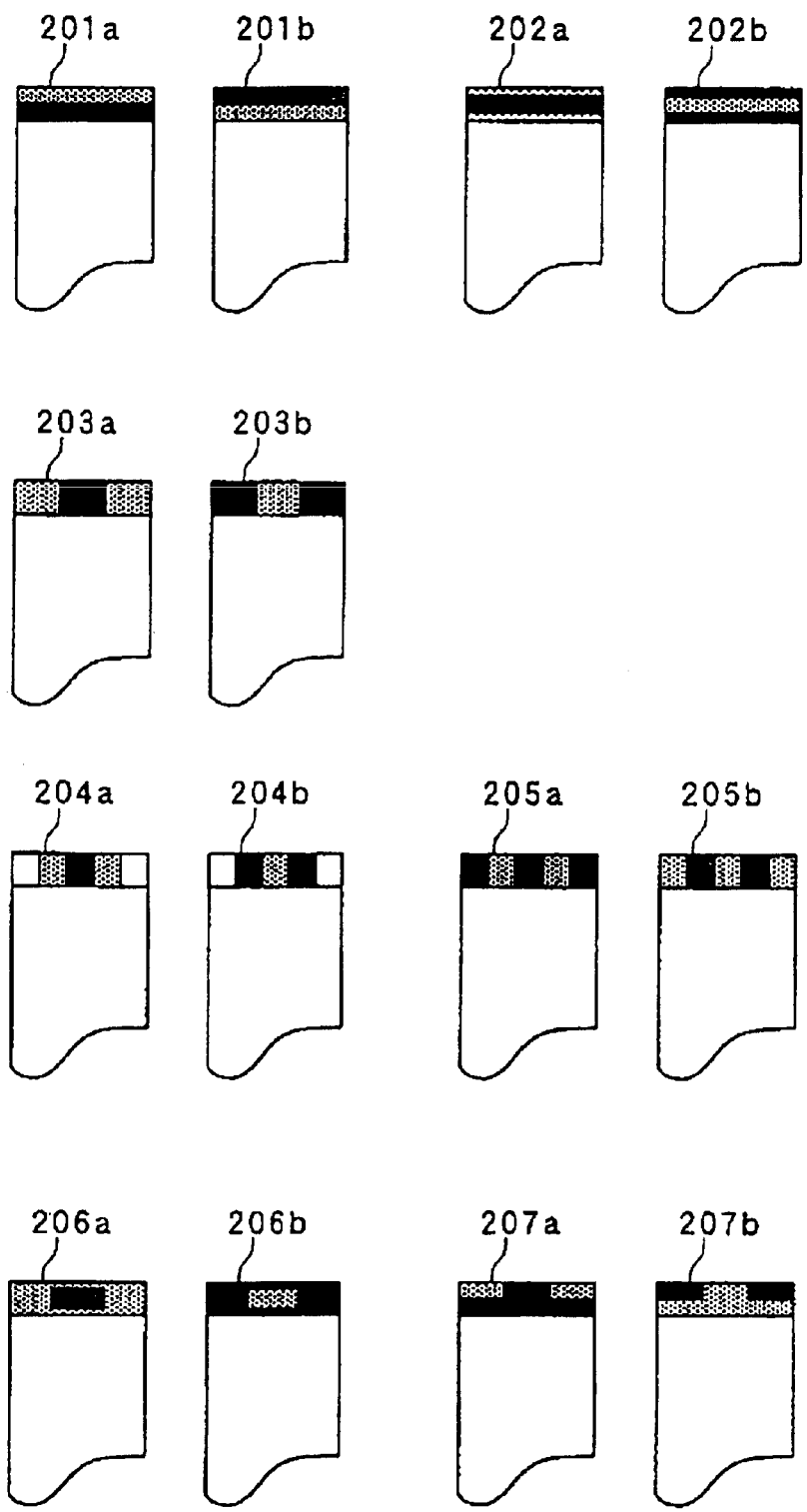
FIG. 20 is a sectional view of a plurality of main discharge electrodes as seen from the longitudinal direction.

FIG. 20 shows sectional views of a plurality of main discharge electrodes as seen from the longitudinal direction.

In the films 201a, 201b, 202a and 202b, a plurality of mixtures are laminated in the direction perpendicular to the surface of the discharge part. In the film 201a, the respective mixtures are laminated so that the mixture ratio of the insulator becomes higher in the layers closer to the discharge part, and in the film 201b, the respective mixtures are laminated so that the mixture ratio of the conductor becomes higher in the layers closer to the discharge part. In the films 202a and 202b, the respective mixtures are laminated alternately. The mixtures may be laminated either according to a specific order or randomly. The number of layers can be determined as required.

In the films 203a, 203b, 204a, 204b, 205a and 205b, a plurality of mixtures are laminated in the lateral direction along the surface of the discharge part. In the films 203b and 204b, the respective mixtures are laminated so that the mixture ratio of the conductor becomes higher in the layers that are closer to the central part of the section. In the film 205a, the respective mixtures are laminated so that the mixture ratio of the insulator becomes higher in the layers that are closer to the central part of the section and the layers that are closer to both end parts. In the film 205b, the respective mixtures are laminated so that the mixture ratio of the conductor becomes higher in the layers that are closer to the central part of the section and the layers that are closer to both end parts. Furthermore, the respective mixtures may be laminated according to a specified order, or may be laminated in a random order. The number of laminated layers is arbitrary.

In the films 206a, 206b, 207a and 207b, layers that partially contain layers comprised of different mixtures are laminated. In the films 206a and 206b, partial layers are disposed inside the films, and in the films 207a and 207b, partial layers are disposed on the outside parts of the films. Thus, the disposition of partial layers is arbitrary.

Figure 21:
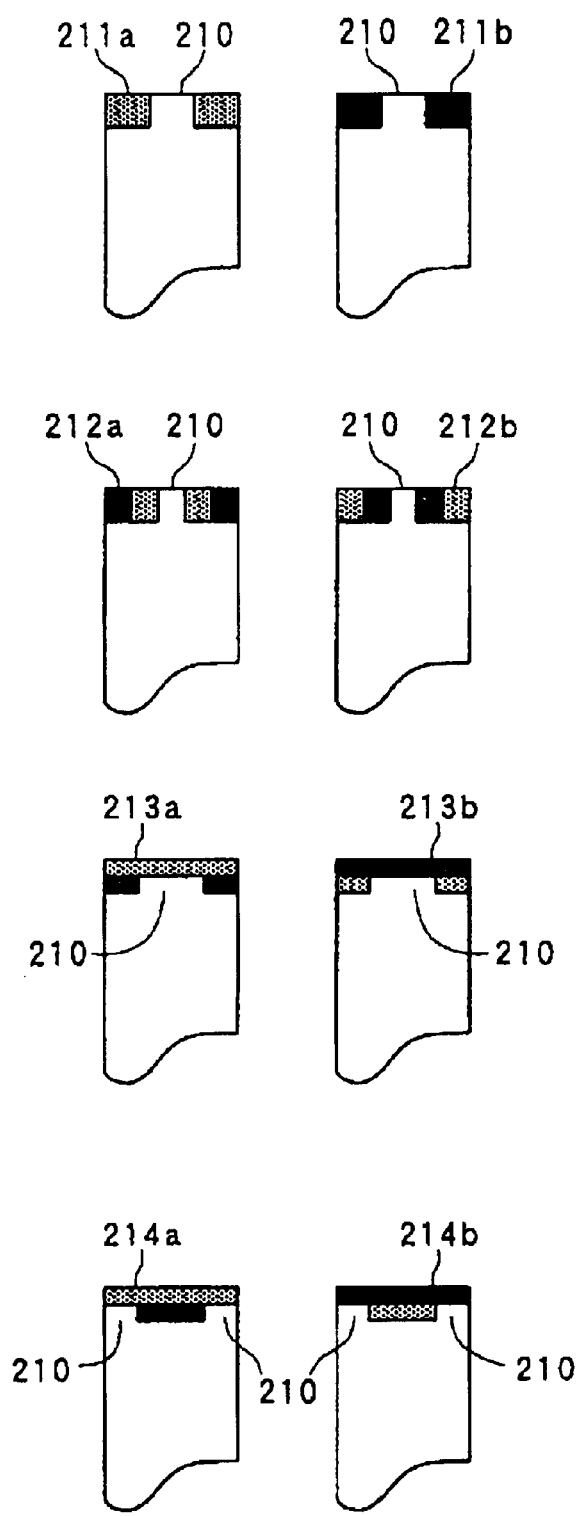
FIG. 21 is a sectional view of a plurality of main discharge electrodes as seen from the longitudinal direction.

FIG. 21 shows sectional views of a plurality of main discharge electrodes as seen from the longitudinal direction.

The films 211a, 211b, 212a and 212b are laminated on the discharge part on both ends of a projecting part 210 that is formed in the central portion. The films 211a and 211b are a single layer, respectively, while the films 212a and 212b comprise a plurality of layers that are laminated along the surface of the discharge part. In the film 212a, the respective mixtures are laminated so that the mixture ratio of the conductor is higher in the layers that are closer to the projecting part 210, and in the film 212b, the respective mixtures are laminated so that the mixture ratio of the insulator is higher in the layers that are closer to the projecting part 210. Furthermore, a plurality of layers may also be laminated in the direction perpendicular to the surface of the discharge part. Moreover, a mixture may also be laminated on top of the projecting part 210 as shown in the films 213a and 213b. Moreover, mixtures may be laminated on a discharge part on which two or more projecting parts 210 are disposed as shown in the films 214a and 214b.

Figure 22:
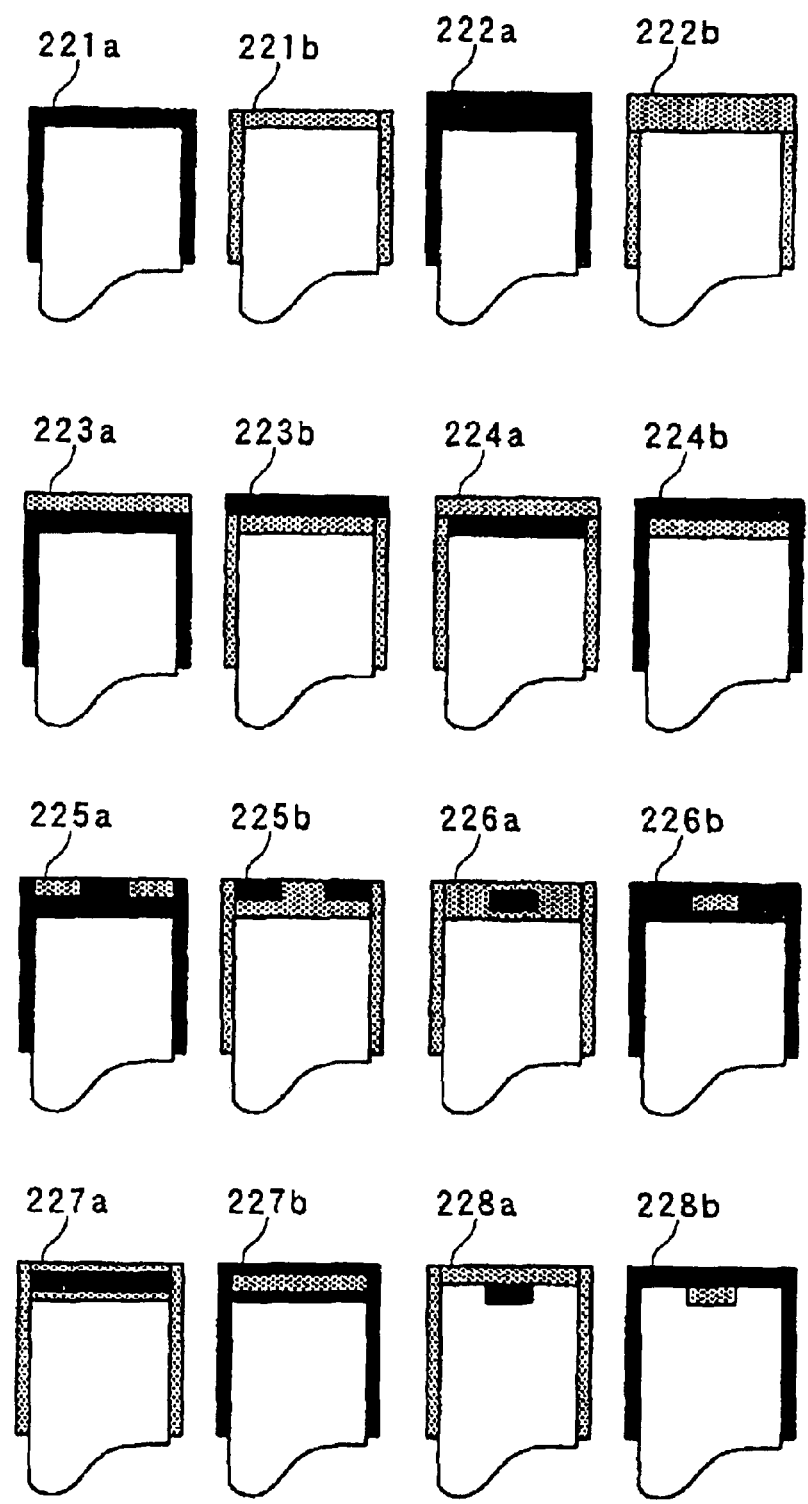
FIG. 22 is a sectional view of a plurality of main discharge electrodes as seen from the longitudinal direction.
Figure 23A:
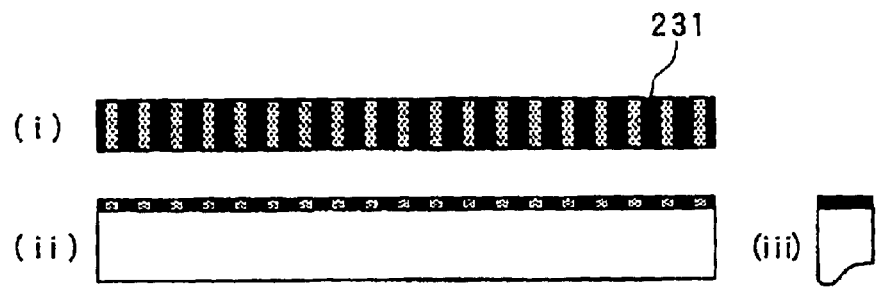
FIGS. 23A through 23D are three-way views of the main discharge electrode as seen respectively from (i) the side of the opposite main discharge electrode, (ii) the direction of width, and (iii) the longitudinal direction.
Figure 23B:
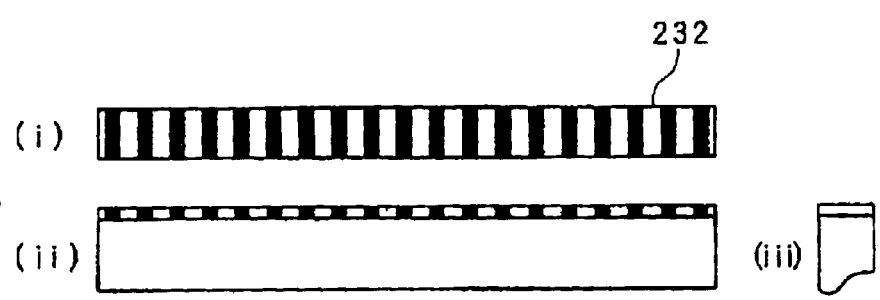
Figure 23C:
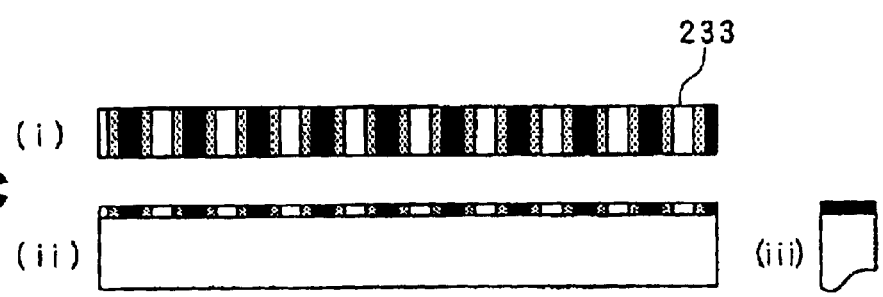
Figure 23D:
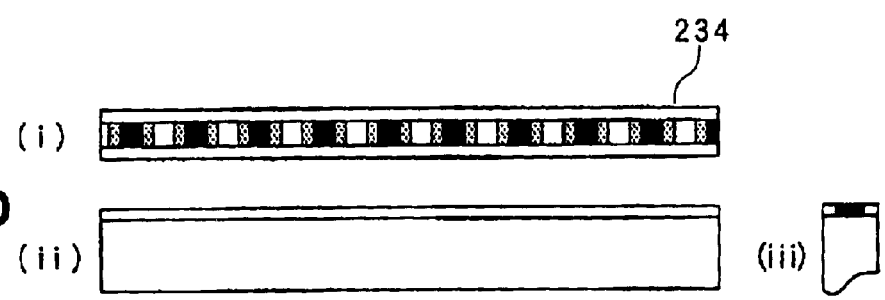
Figure 24A:
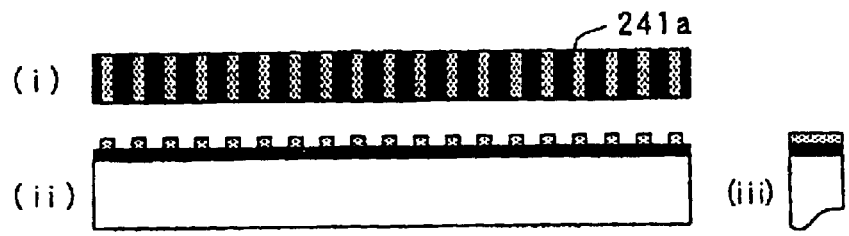
FIGS. 24A through 24F are three-way views of the main discharge electrode as seen respectively from (i) the side of the opposite main discharge electrode, (ii) the direction of width, and (iii) the longitudinal direction.
Figure 24B:
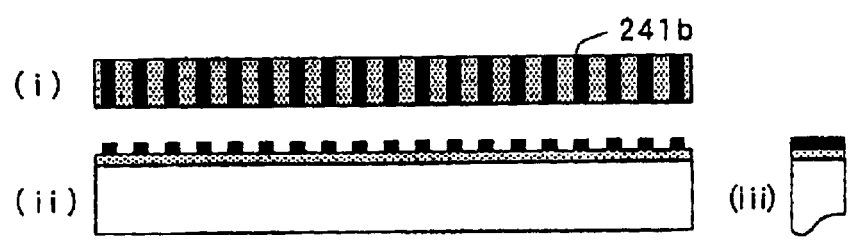
Figure 24C:
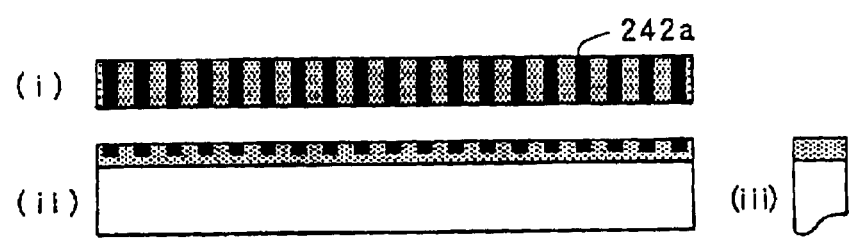
Figure 24D:
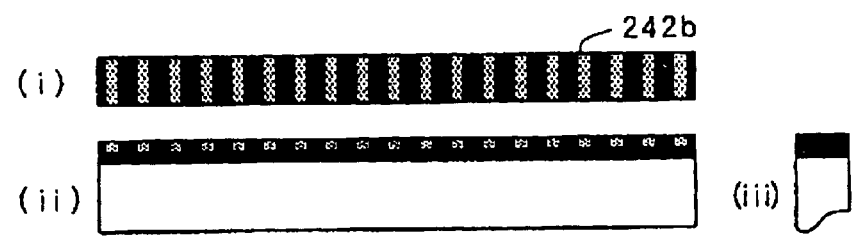
Figure 24E:
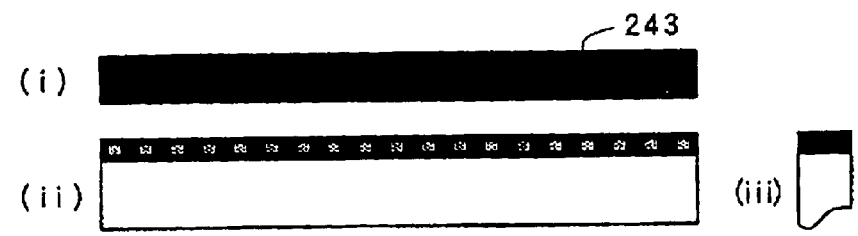
Figure 24F:
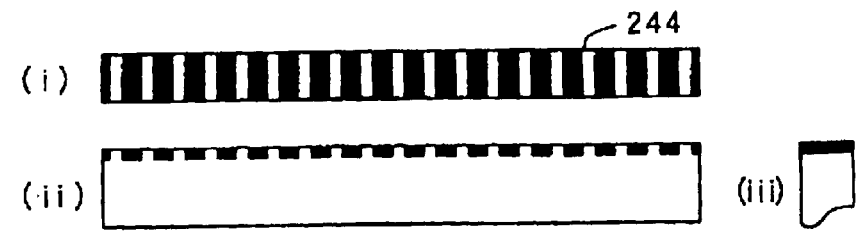

Furthermore, in FIGS. 20 and 21, films that are formed only on the discharge part are shown; however, similar films may be formed not only on the discharge part, but also on the peripheral parts surrounding the discharge part, as in the films 221a and 221b through 228a and 228b shown in FIG. 22.

FIGS. 23A through 23D and FIGS. 24A through 24F are three-way views of main discharge electrodes as seen respectively from (i) the side of the opposite main discharge electrode, (ii) the direction of width, and (iii) the longitudinal direction.

In the films 231 through 233, a plurality of mixtures are laminated in the longitudinal direction along the surface of the discharge part. In the films 231 and 232, the respective mixtures are alternately laminated. In the film 233, the respective mixtures are laminated according to a specified order; however, these mixtures may also be laminated in a random order. In the film 234, a plurality of mixtures are laminated in the longitudinal direction and the direction of width along the surface of the discharge part, and the types of the layers are different between the central portion and both end portions in the direction of width. In the central portion in the direction of width, the respective mixtures are laminated in the longitudinal direction, while both end portions in the direction of width comprise rectilinear single layers. Thus, the types of the layers may be partially varied.

In the films 241a and 241b, linear films are laminated on the surface of a planar film formed on the surface of the discharge part. The linear layers are formed along the direction of width. In the film 241a, the respective mixtures are laminated so that the mixture ratio of the insulator is higher in the layers that are closer to the discharge part, and in the film 241b, the respective mixtures are laminated so that the mixture ratio of the conductor is higher in the layers that are closer to the discharge part. In the films 242a and 242b, linear layers are included in the surface portions of a layer formed on the surface of the discharge part. The linear layers are formed along the direction of width. In the film 243, linear layers are contained inside a layer formed on the surface of the discharge part. These linear layers are formed along the direction of width. Furthermore, in cases where indentations and projections are formed along the direction of width in the surface of the discharge part, linear layers may be formed in the indentations as shown in the film 244.

Examples of films were shown in FIGS. 19A and 19B and FIGS. 24A through 24F above. However, the present invention is not limited to these examples; further combinations of these films are possible.

(2) Film Materials

Typical film materials are shown in Table 1.

TABLE 1

| | Type | Names of Substances Used as Materials |
|---|---|---|
| Single Metal | | Copper, Aluminum, Iron, Nickel |
| Single Ceramic | Oxide Type | Alumina (Aluminum Oxide), Yttria (Yttrium Oxide), Zirconia (Zirconium Oxide) |
| | Fluoride Type | Calcium Fluoride, Strontium Fluoride, Magnesium Fluoride, Lithium Fluoride, Copper Fluoride |
| | Chloride Type | Sodium Chloride, Calcium Chloride |
| | Nitride Type | Aluminum Nitride |
| Alloy | | Matrix Material of Copper, Aluminum, Nickel or the Like, and Doping Material of Zinc, Magnesium, Strontium, Calcium, Aluminum or the Like |
| Conductive Ceramics | Titanium Type | $TiO_2$, $TiB_2$, TiC, TiN |
| | Silicon Type | $SiO_2/C$, $CaSiO_3/C$, $Si_3N_4$ |

As is shown in Table 1, the substances used as film materials may be classified into single metals, single ceramics, alloys and conductive ceramics. Single ceramics may be further divided into oxide type, fluoride type, chloride type and nitride type ceramics, and conductive ceramics may be further divided into titanium type and silicon type ceramics.

Single metals themselves and alloys themselves offer the advantage of contributing to the improvement of the discharge resistance and stabilization of the discharge. In cases where single metals or alloys are contained in the film, or in cases where single metals are mixed with the matrix material as impurities, the surfaces of the discharge parts of the main discharge electrodes are modified, so that in particular, an effect that increases the hardness can be obtained.

Single ceramics themselves offer the advantage of inhibiting halogen corrosion. Furthermore, oxide type ceramics offer the advantage of easy working by means of flame coating or the like, fluoride type ceramics offer the advantage of being little affected by fluorine contained in the laser gas, and chloride type ceramics offer the advantage of being little affected by chlorine contained in the laser gas. In cases where single ceramics are contained in the film, an effect that makes it possible to inhibit corrosion of the matrix material by halogen gases is obtained.

Conductive ceramics themselves offer the advantage of superior electrical conductivity. In cases where conductive ceramics are contained on the film, an effect that makes it possible to inhibit corrosion of the matrix material by halogen gases is obtained.

Even if the substances shown in Table 1 are used singly, a certain effect may be expected in terms of prolonging the useful life of the main discharge electrodes. In actuality, however, single metals, single ceramics, alloys and conductive ceramics are used in mixtures at appropriate ratios in order to achieve the desired balance between characteristics such as the maintenance of electrical conductivity, durable performance and the like, with consideration being given to the types of halogen gases involved and the application of the apparatus.

Some concrete examples will be described. Ions are generated between the main discharge electrodes by the discharge. Among the ions that are generated, positive ions are accelerated between the main discharge electrodes and collide with the main discharge electrode on the cathode side. As a result, the substance that was in ion form adheres to the discharge part, and so-called sputtering, in which metal atoms are released form the discharge part, takes place. When the main discharge electrode on the anode side following repeated discharges is compared with the main discharge electrode on the cathode side, it is found that the main discharge electrode on the anode side shows extensive fluorine erosion, while the main discharge electrode on the cathode side is modified by sputtering in addition to fluorine erosion.

In cases where the durability of the main discharge electrodes is considered important, a film that is strongly resistant to fluorine erosion is formed on the main discharge electrode on the anode side, and a film that is strongly resistant to fluorine erosion and strongly resistant to sputtering is formed on the main discharge electrode on the cathode side. As a result, the replacement interval of the main discharge electrodes can be extended, so that the maintenance interval of the gas laser apparatus can be extended.

Among the substances shown in Table 1, it has been demonstrated that zirconia is a substance that is strongly resistant of fluorine erosion and strongly resistant to sputtering. In cases where the matrix material of the main discharge electrodes is copper, the main discharge electrode on the cathode side is flame-coated with a mixture of zirconia and copper, and the main discharge electrode on the anode side is flame-coated with a mixture of alumina and copper. Alternatively, the main discharge electrodes on both the anode side and cathode side may be flame-coated with a mixture of zirconia and copper. In this case, the mixture ratio of zirconia is set so that this ratio is higher on the cathode side than on the anode side.

On the other hand, in cases where efficiency is considered to be important, a film that is strongly resistant to fluorine erosion is formed on the main discharge electrode on the anode side, and no film is formed on the main discharge electrode on the cathode side. The film formed on the discharge parts is, so to speak, a blocking substance. Accordingly, from the standpoint of improving the efficiency, it is not desirable to form a film on the discharge parts. However, since the effect of fluorine erosion is great on the main discharge electrode on the anode side, a film is formed only on the main discharge electrode on the anode side.

Thus, respectively different films may be formed on the main discharge electrode on the anode side and the main discharge electrode on the cathode side, or, as was described above, the same film may be formed on the main discharge electrode on the anode side and the main discharge electrode on the cathode side.

What is claimed is:

1. A discharge electrode which contains a metal material, and which is used in a laser apparatus and exposed to a laser gas containing a halogen gas that is excited by a discharge performed between electrodes, wherein an insulator film containing one or more substances that have a higher hardness than the metal and that are less reactive with the halogen gas than the metal is formed on surfaces of portions where the discharge is performed.

2. The discharge electrodes according to claim 1, wherein the insulator is a ceramic.

3. The discharge electrodes according to claim 1, wherein the insulator is free of fluorine compounds.

4. The discharge electrodes according to claim 1, wherein the insulator includes a fluorine compound in admixture with other compounds.

5. A discharge electrode which contains a metal material, and which is used in a laser apparatus and exposed to a laser gas containing a halogen gas that is excited by a discharge performed between electrodes, wherein an insulator film containing one or more substances that have a higher melting point than the metal and that are less reactive with the halogen gas than the metal is formed on surfaces of portions where the discharge is performed.

6. The discharge electrodes according to claim 5, wherein the insulator is a ceramic.

7. The discharge electrodes according to claim 5, wherein the insulator is free of fluorine compounds.

8. The discharge electrodes according to claim 5, wherein the insulator includes a fluorine compound in admixture with other compounds.

9. A discharge electrode which contains a metal material, and which is used in a laser apparatus and exposed to a laser gas containing a halogen gas that is excited by a discharge performed between electrodes, wherein a film of a mixture of an insulator and a conductor containing one or more substances that have a higher hardness than the metal and that are less reactive with the halogen gas than the metal is formed on surfaces of portions where the discharge is performed.

10. The discharge electrodes according to claim 9, wherein the film is a laminated film in which layers of the conductor and layers of the insulator are alternatively laminated.

11. The discharge electrodes according to claim 10, wherein the insulator is a ceramic.

12. The discharge electrodes according to claim 9, wherein the insulator is a ceramic.

13. The discharge electrodes according to claim 9, wherein the insulator is free of fluorine compounds.

14. The discharge electrodes according to claim 9, wherein the insulator includes a fluorine compound in admixture with other compounds.

15. A discharge electrode which contains a metal material, and which is used in a laser apparatus and exposed to a laser gas containing a halogen gas that is excited by a discharge performed between electrodes, wherein a film of a mixture of an insulator and a conductor containing one or more substances that have a higher melting point than the metal and that are less reactive with the halogen gas than the metal is formed on surfaces of portions where the discharge is performed.

16. The discharge electrodes according to claim 15, wherein the film is a laminated film in which layers of the conductor and layers of the insulator are alternatively laminated.

17. The discharge electrodes according to claim 16, wherein the insulator is a ceramic.

18. The discharge electrodes according to claim 15, wherein the insulator is a ceramic.

19. The discharge electrodes according to claim 15, wherein the insulator is free of fluorine compounds.

20. The discharge electrodes according to claim 15, wherein the insulator includes a fluorine compound in admixture with other compounds.

* * * * *